US008277305B2

(12) United States Patent
Caputo et al.

(10) Patent No.: US 8,277,305 B2
(45) Date of Patent: Oct. 2, 2012

(54) GAMING DEVICE AND METHOD FOR PROVIDING A FREE SPIN GAME WITH PAYLINE MULTIPLIERS

(75) Inventors: Scott A. Caputo, Santa Clara, CA (US); Mark C. Nicely, Daly City, CA (US); Ryan M. Griffin, Reno, NV (US)

(73) Assignee: IGT, Reno, NV (US)

( * ) Notice: Subject to any disclaimer, the term of this patent is extended or adjusted under 35 U.S.C. 154(b) by 1229 days.

(21) Appl. No.: 11/937,814

(22) Filed: Nov. 9, 2007

(65) Prior Publication Data

US 2009/0124326 A1 May 14, 2009

(51) Int. Cl.
*A63F 9/24* (2006.01)
*A63F 13/00* (2006.01)

(52) U.S. Cl. ................ 463/20; 463/16; 463/17; 463/21; 463/22; 273/138.1; 273/138.2; 273/143 R

(58) Field of Classification Search .............. 463/16–17, 463/20–22, 25; 273/138.1, 138.2, 143 R
See application file for complete search history.

(56) References Cited

U.S. PATENT DOCUMENTS

| | | | |
|---|---|---|---|
| 4,448,419 | A | 5/1984 | Telnaes |
| 4,624,459 | A | 11/1986 | Kaufman |
| 4,695,053 | A | 9/1987 | Vazquez, Jr. et al. |
| 4,838,552 | A | 6/1989 | Hagiwara |
| 4,991,848 | A | 2/1991 | Greenwood et al. |
| 5,205,555 | A | 4/1993 | Hamano |
| RE34,244 | E | 5/1993 | Hagiwara |
| 5,342,047 | A | 8/1994 | Heidel et al. |
| 5,393,057 | A | 2/1995 | Marnell, II |
| 5,407,200 | A | 4/1995 | Zalabak |
| 5,423,539 | A | 6/1995 | Nagao |
| 5,449,173 | A | 9/1995 | Thomas et al. |
| 5,456,465 | A | 10/1995 | Durham |
| 5,489,101 | A | 2/1996 | Moody |
| 5,531,448 | A | 7/1996 | Moody |
| 5,560,603 | A | 10/1996 | Seelig et al. |
| 5,611,535 | A | 3/1997 | Tiberio |
| 5,647,798 | A | 7/1997 | Falciglia |
| 5,722,891 | A | 3/1998 | Inoue |

(Continued)

FOREIGN PATENT DOCUMENTS

| | | |
|---|---|---|
| AU | 199716432 | 9/1997 |

(Continued)

OTHER PUBLICATIONS

Bonus Times Article, written by Strictly Slots, published in Jul. 2000.
Catch a Wave Advertisement, written by IGT, published in Dec. 2000.
Creepy and Kooky Article, written by Strictly Slots, published Jul. 2000.
Cuckoo Aristocrat Brochure, written by Aristocrat, published in Feb. 1998.

(Continued)

*Primary Examiner* — Dmitry Suhol
*Assistant Examiner* — Ryan Hsu
(74) *Attorney, Agent, or Firm* — Neal, Gerber & Eisenberg LLP

(57) ABSTRACT

A gaming device provides a free spins game wherein a plurality of modifiers are each associated with one of a plurality of paylines. During the free spins game, each modifier modifies awards won on the particular payline with which it is associated. In one embodiment, the payline multipliers increase in each of the free spins depending on whether a given payline scores a win or not in the free spin.

35 Claims, 15 Drawing Sheets

U.S. PATENT DOCUMENTS 5,732,948 A 3/1998 Yoseloff
5,732,950 A 3/1998 Moody
5,762,552 A 6/1998 Vuong et al.
5,769,716 A 6/1998 Saffari et al.
5,772,506 A 6/1998 Marks et al.
5,775,692 A 7/1998 Watts et al.
5,778,573 A 7/1998 Nottingham et al.
5,788,573 A 8/1998 Baerlocher et al.
5,807,172 A 9/1998 Piechowiak
5,816,916 A 10/1998 Moody
5,823,873 A 10/1998 Moody
5,823,874 A 10/1998 Adams
5,833,537 A * 11/1998 Barrie .............................. 463/21
5,848,932 A 12/1998 Adams
5,851,148 A 12/1998 Brune et al.
5,882,261 A 3/1999 Adams
5,890,962 A 4/1999 Takemoto
5,911,418 A 6/1999 Adams
5,919,088 A 7/1999 Weiss
5,935,002 A 8/1999 Falciglia
5,947,820 A 9/1999 Morro et al.
5,954,335 A 9/1999 Moody
5,964,463 A 10/1999 Moore, Jr.
5,971,849 A 10/1999 Falciglia
5,980,384 A 11/1999 Barrie
5,984,781 A 11/1999 Sunaga
5,984,782 A 11/1999 Inoue
5,989,121 A 11/1999 Sakamoto
6,004,207 A 12/1999 Wilson, Jr. et al.
6,007,066 A 12/1999 Moody
6,012,982 A 1/2000 Piechowiak et al.
6,056,642 A 5/2000 Bennett
6,056,648 A 5/2000 Kusumoto et al.
6,059,289 A 5/2000 Vancura
6,059,658 A 5/2000 Mangano et al.
6,062,980 A 5/2000 Luciano
6,089,977 A 7/2000 Bennett
6,089,978 A 7/2000 Adams
6,095,921 A 8/2000 Walker et al.
6,098,985 A 8/2000 Moody
6,102,400 A 8/2000 Scott et al.
6,113,098 A 9/2000 Adams
6,117,009 A 9/2000 Yoseloff
6,120,377 A 9/2000 McGinnis et al.
6,120,378 A 9/2000 Moody et al.
6,126,542 A 10/2000 Fier
6,135,884 A 10/2000 Hedrick et al.
6,142,873 A 11/2000 Weiss
6,149,521 A 11/2000 Sanduski
6,155,925 A 12/2000 Giobbi et al.
6,159,095 A 12/2000 Frohm et al.
6,159,097 A 12/2000 Gura
6,168,520 B1 1/2001 Baerlocher et al.
6,168,523 B1 1/2001 Piechowiak et al.
6,173,955 B1 1/2001 Perrie
6,174,233 B1 1/2001 Sunaga et al.
6,179,711 B1 1/2001 Yoseloff
6,186,894 B1 2/2001 Mayeroff
6,190,254 B1 2/2001 Bennett
6,200,217 B1 3/2001 Osawa
6,203,429 B1 3/2001 Demar et al.
6,220,959 B1 4/2001 Holmes, Jr.
6,224,483 B1 5/2001 Mayeroff
6,227,971 B1 5/2001 Weiss
6,231,442 B1 5/2001 Mayeroff
6,234,897 B1 5/2001 Frohm et al.
6,238,287 B1 5/2001 Komori
6,238,288 B1 5/2001 Walker
6,241,607 B1 6/2001 Payne
6,251,013 B1 6/2001 Bennett
6,261,177 B1 7/2001 Bennett
6,261,178 B1 7/2001 Bennett
6,270,411 B1 8/2001 Gura et al.
6,270,412 B1 8/2001 Crawford et al.
6,299,165 B1 10/2001 Nagano
6,305,686 B1 10/2001 Perrie et al.
6,309,299 B1 10/2001 Weiss
6,309,300 B1 10/2001 Glavich
6,311,976 B1 11/2001 Yoseloff et al.
6,315,660 B1 11/2001 DeMar et al.
6,328,649 B1 12/2001 Randall
6,334,814 B1 1/2002 Adams
6,336,860 B1 1/2002 Webb
6,336,863 B1 1/2002 Baerlocher et al.
6,340,158 B2 1/2002 Pierce
6,346,043 B1 2/2002 Colin et al.
6,347,996 B1 2/2002 Gilmore
6,358,147 B1 3/2002 Jaffe
6,364,766 B1 4/2002 Anderson
6,368,216 B1 4/2002 Hedrick et al.
6,368,218 B2 4/2002 Angell, Jr.
6,394,902 B1 5/2002 Glavich et al.
6,398,644 B1 6/2002 Perrie
6,406,369 B1 6/2002 Baerlocher
6,413,160 B1 7/2002 Vancura
6,413,162 B1 7/2002 Baerlocher
6,416,408 B2 7/2002 Tracy et al.
6,419,579 B1 7/2002 Bennett
6,435,511 B1 8/2002 Vancura et al.
6,443,452 B1 9/2002 Brune
6,454,651 B1 9/2002 Yoseloff
6,471,208 B2 10/2002 Yoseloff
6,481,713 B2 11/2002 Perrie et al.
6,491,584 B2 12/2002 Graham et al.
6,506,118 B1 1/2003 Baerlocher et al.
6,514,141 B1 2/2003 Kaminkow et al.
6,517,432 B1 2/2003 Jaffe
6,533,279 B2 3/2003 Moody et al.
6,533,658 B1 3/2003 Walker et al.
6,537,150 B1 3/2003 Luciano et al.
6,537,152 B2 3/2003 Seelig et al.
6,547,242 B1 4/2003 Sugiyama et al.
6,558,253 B1 5/2003 DeSimone et al.
6,561,904 B2 5/2003 Locke et al.
6,565,436 B1 5/2003 Baerlocher
6,569,015 B1 5/2003 Baerlocher
6,602,137 B2 8/2003 Kaminkow et al.
6,604,740 B1 8/2003 Singer et al.
6,604,999 B2 8/2003 Ainsworth
6,605,002 B2 8/2003 Baerlocher
6,612,927 B1 9/2003 Slomiany et al.
6,634,945 B2 10/2003 Glavich et al.
6,638,164 B2 10/2003 Randall
6,648,759 B2 11/2003 Vancura
6,663,489 B2 12/2003 Baerlocher
6,688,977 B1 2/2004 Baerlocher et al.
6,692,355 B2 2/2004 Baerlocher et al.
6,695,696 B1 2/2004 Kaminkow
6,705,944 B2 3/2004 Luciano
6,711,189 B1 3/2004 Gilliland et al.
6,719,630 B1 4/2004 Seelig et al.
6,729,621 B2 5/2004 Moody
6,776,711 B1 8/2004 Baerlocher
6,780,105 B1 8/2004 Kaminkow
6,796,904 B2 9/2004 Yoseloff
6,802,773 B2 10/2004 Moody
6,805,349 B2 10/2004 Baerlocher et al.
6,869,360 B2 3/2005 Marks et al.
6,913,532 B2 7/2005 Baerlocher et al.
6,955,600 B2 10/2005 Glavich et al.
6,960,133 B1 11/2005 Marks et al.
6,960,134 B2 11/2005 Hartl et al.
6,971,954 B2 12/2005 Randall
7,001,274 B2 2/2006 Baerlocher et al.
7,004,835 B2 2/2006 Baerlocher
7,014,560 B2 3/2006 Glavich et al.
7,052,395 B2 5/2006 Glavich et al.
7,056,213 B2 6/2006 Ching et al.
7,066,814 B2 6/2006 Glavich et al.
7,070,501 B2 7/2006 Cormack et al.
7,074,127 B2 7/2006 Cuddy et al.
7,090,580 B2 8/2006 Rodgers et al.
7,094,148 B2 8/2006 Baerlocher et al.
7,121,942 B2 * 10/2006 Baerlocher ..................... 463/20
7,147,559 B2 12/2006 Englman
7,169,042 B2 1/2007 Muir et al.
7,198,570 B2 4/2007 Rodgers et al.

| | | | | |
|---|---|---|---|---|
| 7,235,011 | B2 | 6/2007 | Randall et al. | |
| 7,238,110 | B2 | 7/2007 | Glavich et al. | |
| 7,247,092 | B2 | 7/2007 | Jarvis et al. | |
| 7,250,001 | B2 | 7/2007 | Baerlocher et al. | |
| 7,258,611 | B2 * | 8/2007 | Bigelow et al. | 463/25 |
| 7,300,351 | B2 | 11/2007 | Thomas | |
| 7,306,518 | B2 | 12/2007 | Hughs-Baird et al. | |
| 7,322,887 | B2 | 1/2008 | Belger et al. | |
| 7,326,109 | B2 | 2/2008 | Baerlocher | |
| 7,331,862 | B2 | 2/2008 | Rodgers et al. | |
| 7,331,863 | B2 | 2/2008 | Baerlocher | |
| 7,331,867 | B2 | 2/2008 | Baerlocher et al. | |
| 7,338,370 | B2 | 3/2008 | Oles et al. | |
| 7,381,134 | B2 | 6/2008 | Cuddy et al. | |
| 7,384,334 | B2 | 6/2008 | Glavich et al. | |
| 7,402,103 | B2 * | 7/2008 | Baerlocher | 463/20 |
| 7,473,174 | B2 | 1/2009 | Cuddy et al. | |
| 7,481,708 | B2 * | 1/2009 | Baerlocher et al. | 463/20 |
| 7,625,280 | B2 | 12/2009 | Singer et al. | |
| 7,819,740 | B2 * | 10/2010 | Masci et al. | 463/20 |
| 7,922,575 | B2 | 4/2011 | Jankowski | |
| 2001/0009865 | A1 | 7/2001 | Demar et al. | |
| 2002/0010017 | A1 | 1/2002 | Bennett | |
| 2003/0054872 | A1 | 3/2003 | Locke et al. | |
| 2003/0054875 | A1 | 3/2003 | Marks et al. | |
| 2003/0060266 | A1 | 3/2003 | Baerlocher | |
| 2003/0060268 | A1 | 3/2003 | Falconer | |
| 2003/0060272 | A1 | 3/2003 | Glavich et al. | |
| 2003/0073483 | A1 | 4/2003 | Glavich et al. | |
| 2003/0162585 | A1 * | 8/2003 | Bigelow et al. | 463/20 |
| 2003/0216165 | A1 | 11/2003 | Singer et al. | |
| 2004/0048649 | A1 | 3/2004 | Peterson et al. | |
| 2004/0048650 | A1 | 3/2004 | Mierau et al. | |
| 2004/0053666 | A1 | 3/2004 | Vancura | |
| 2004/0053669 | A1 | 3/2004 | Gerrard et al. | |
| 2004/0063493 | A1 | 4/2004 | Baerlocher | |
| 2004/0152500 | A1 | 8/2004 | Baerlocher | |
| 2004/0192431 | A1 | 9/2004 | Singer et al. | |
| 2004/0195773 | A1 * | 10/2004 | Masci et al. | 273/317 |
| 2004/0242302 | A1 | 12/2004 | Baerlocher | |
| 2004/0242313 | A1 | 12/2004 | Munoz | |
| 2004/0266512 | A1 | 12/2004 | Kaminkow | |
| 2004/0266517 | A1 | 12/2004 | Bleich et al. | |
| 2005/0020346 | A1 | 1/2005 | Baerlocher | |
| 2005/0049035 | A1 | 3/2005 | Baerlocher et al. | |
| 2005/0054416 | A1 | 3/2005 | Hostetler et al. | |
| 2005/0054429 | A1 | 3/2005 | Baerlocher et al. | |
| 2005/0075163 | A1 | 4/2005 | Cuddy et al. | |
| 2005/0101379 | A1 | 5/2005 | Falconer | |
| 2005/0170876 | A1 | 8/2005 | Masci et al. | |
| 2005/0192081 | A1 | 9/2005 | Marks et al. | |
| 2006/0003827 | A1 | 1/2006 | Hartl et al. | |
| 2006/0009277 | A1 | 1/2006 | Hartl et al. | |
| 2006/0063585 | A1 | 3/2006 | Cuddy | |
| 2006/0068884 | A1 * | 3/2006 | Baerlocher et al. | 463/20 |
| 2006/0068885 | A1 | 3/2006 | Cregan et al. | |
| 2006/0073876 | A1 | 4/2006 | Cuddy | |
| 2006/0084494 | A1 | 4/2006 | Belger et al. | |
| 2006/0199636 | A1 | 9/2006 | Ching et al. | |
| 2006/0199637 | A1 | 9/2006 | Ching et al. | |
| 2006/0246989 | A1 | 11/2006 | Glavich et al. | |
| 2007/0010316 | A1 | 1/2007 | Baerlocher et al. | |
| 2007/0021188 | A1 | 1/2007 | Rodgers et al. | |
| 2007/0049372 | A1 | 3/2007 | Olivas et al. | |
| 2007/0060294 | A1 | 3/2007 | Cuddy et al. | |
| 2007/0060300 | A1 | 3/2007 | Baerlocher | |
| 2007/0087809 | A1 | 4/2007 | Baerlocher | |
| 2007/0281778 | A1 | 12/2007 | Bigelow, Jr. et al. | |
| 2007/0287521 | A1 | 12/2007 | Glavich et al. | |
| 2008/0090635 | A1 | 4/2008 | Hughs-Baird et al. | |
| 2008/0090646 | A1 | 4/2008 | Hughs-Baird et al. | |
| 2008/0090661 | A1 | 4/2008 | Hughs-Baird et al. | |
| 2008/0113735 | A1 | 5/2008 | Maya | |
| 2008/0113760 | A1 | 5/2008 | Baerlocher | |
| 2008/0113761 | A1 | 5/2008 | Belger et al. | |
| 2008/0113779 | A1 | 5/2008 | Cregan | |
| 2008/0132325 | A1 | 6/2008 | Oles et al. | |
| 2008/0139296 | A1 | 6/2008 | Baerlocher et al. | |
| 2008/0139298 | A1 | 6/2008 | Rodgers et al. | |
| 2008/0200232 | A1 | 8/2008 | Baerlocher et al. | |
| 2008/0200237 | A1 | 8/2008 | Cuddy et al. | |
| 2009/0111557 | A1 | 4/2009 | Jankowski | |

FOREIGN PATENT DOCUMENTS

| | | |
|---|---|---|
| AU | A-50327/96 | 10/1997 |
| EP | 0798676 | 10/1997 |
| EP | 0874337 | 10/1998 |
| EP | 0926645 | 6/1999 |
| EP | 0944030 | 9/1999 |
| EP | 0945837 | 9/1999 |
| EP | 0984409 | 3/2000 |
| EP | 1 513 117 A2 | 3/2005 |
| FR | 2739954 | 4/1997 |
| GB | 2 151 830 | 7/1985 |
| GB | 2 153 572 | 8/1985 |
| GB | 2 328 311 | 2/1999 |
| WO | WO 00/12186 | 3/2000 |
| WO | WO 00/32286 | 6/2000 |
| WO | WO 01/26019 | 4/2001 |
| WO | WO 03/075235 | 9/2003 |
| WO | WO 2004/025584 | 3/2004 |

OTHER PUBLICATIONS

Dolphin Treasure Advertisement, written by Aristocrat Leisure Industries Pty. Ltd, published in 1994.

DoubleBucks Brochure, written by IGT, available prior to Nov. 9, 2007.

Ghoulish Gamble Advertisement, written by Strictly Slots, published in Nov. 2000.

Good Times Brochure, written by IGT, published in 1999.

Leopard Spots™ (website), written by www.igt.com, printed on Mar. 21, 2001.

Mega Multiplier® (website), written by www.wmsgaming.com, printed on May 22, 2001.

Monopoly Brochures and Articles, written by WMS Gaming, Inc. published in 1998.

Monopoly Party Train Article, written by Strictly Slots, published in Feb. 2002.

Neon Nights, written by IGT, published in 2000.

Roll & Win Advertisement, written by WMS Gaming, wmsgaming.com, printed on Jun. 8, 2001.

Slot Machines a Pictorial History of the First 100 Years (pp. 216, 242 to 243), 5th edition, written by Marshall Fey, published in 1983-1997.

Spin Til You Win Game Description, written by IGT, published in 1996.

Super Times Pay Poker advertisement written by www.actiongaming.com printed Mar. 24, 2005.

Take Your Pick Advertisement, written by IGT/Anchor Gaming, published in 1999.

Take Your Pick Article, written by Strictly Slots, published in Mar. 2001.

Thai Treasures Game Description, written by WWM Gaming, printed on Jun. 19, 2008, available prior to Nov. 9, 2007.

Top Cat Brochure, written by WMS Gaming, Inc., available prior to Nov. 9, 2007.

Totem Pole Advertisement, written by IGT, published in 1997.

Treasure Wheel Double Jackpot Brochure, written by Sigma Game, Inc., published in 2001.

Triple Bucks Advertisement, written by IGT, published in 1999.

Triple Play Poker advertisement, written by www.actiongaming.com, printed on Mar. 24, 2005.

Twice Your Honey game description, written by IGT, available prior to Nov. 9, 2007.

Winning Streak Web Site Description, written by WMS Gaming Inc. (web site), printed on Mar. 21, 2001.

X Factor Brochure and Website Page, written by WMS Gaming, Inc., published in 1998.

Yahtzee Video Game Advertisement, written by Mikohn Winning Solutions Worldwide, published in 1999.

* cited by examiner

GAMING DEVICE AND METHOD FOR PROVIDING A FREE SPIN GAME WITH PAYLINE MULTIPLIERS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

Secondary or bonus games are also known in gaming machines. The secondary or bonus games usually provide an additional award to the player. Secondary or bonus games typically do not require an additional wager by the player to be activated.

One way to enhance enjoyment and excitement is by providing secondary or bonus games in which players have the opportunity to win potentially large awards or credits in addition to the awards associated with the base games of the gaming devices. One such secondary or bonus game for slot games provides a player one or more free spins. In these gaming devices, upon an occurrence of a triggering event in the primary game, the gaming device provides a free spin mode or sequence wherein one or more free spins of the reels are provided to the player. The player plays the free spin game or sequence, likely receives one or more awards during one or more of the free spins and returns to the primary game. Free spin games typically provide players with large awards or the potential to win large awards and, therefore, are attractive to players.

Another way that gaming device manufacturers provide larger awards to players is by using multipliers. A multiplier increases the award amount proportionally to the value of the multiplier. For example, a “2×” multiplier pays twice the normal award value. A “3×” multiplier pays three times the normal award value. Some games also employ an incrementing multiplier. It should be appreciated that multipliers may substantially elevate award returns and increase player excitement and enjoyment.

Players enjoy playing for high awards. Thus, to increase player enjoyment and excitement, a need exists to provide new ways to provide awards in one or more free spin games.

SUMMARY

In one embodiment, the gaming device and method for operating a gaming device disclosed herein provides a game including a plurality of reels, a plurality of symbols on or associated with each reel, and a plurality of free spins or free activations of the reels. One or more paylines are associated with the reels to indicate symbols or symbol combinations, which are evaluated for designated symbol combinations. In one embodiment, each of the paylines is associated with a modifier. It should be appreciated that the terms free spins and free activations are used interchangeably herein.

In one embodiment, upon initiation of the game, the gaming device determines and displays an initial modifier value for each of the modifiers associated with the paylines. The gaming device provides a player with a plurality of free spins of the reels in the game. The number of free spins provided to the player may be pre-determined, randomly determined, determined during the play of, for example, a base or primary game, or determined in any other suitable manner. For each of the provided free spins, the gaming device activates or enables the player to initiate an activation of the reels. After the reels are activated, the gaming device determines if any designated symbol combinations are indicated on any of the paylines. For each designated symbol combination indicated on each of the paylines, an award is provided to the player, wherein the award is modified by the modifier associated with that payline. In one embodiment, after the gaming device provides any awards to the player, the modifier associated with each payline on which a designated symbol combination occurred is incremented, such that the incremented modifier is applied to any award generated on that payline in a next free spin of the reels. This continues until there are no free spins remaining in the game. In one embodiment, when there are no free spins remaining in the game, each of the payline modifiers is reset to its initial modifier value. In another embodiment, a maximum modifier value is established, such that once a payline modifier reaches the maximum modifier value during the game, it resets to its initial modifier value.

Accordingly, the present disclosure provides a free spins game including modifiers which are tied to specific paylines. In various embodiments, each modifier only modifies awards won on the particular payline with which it is associated. In one embodiment, the gaming device increments each modifier when a winning symbol combination occurs on the payline with which that modifier is associated. This creates excitement as a player hopes to get multiple wins in a row on the same payline. In one alternative embodiment, rather than incrementing a modifier when a winning symbol combination occurs on the payline with which that modifier is associated, the gaming device increments the modifier when a non-winning symbol combination is indicated on the payline. In various alternative embodiments, the gaming device increments the modifier associated with each payline when a designated quantity or a designated combination of sub-symbols are indicated on the payline, as will be discussed in more detail below.

It should be appreciated that the initial modifier values associated with each of the paylines in the free spins game may be determined in any suitable manner. For example, in different embodiments, the initial modifier values are predetermined, randomly determined, determined based on the player's status (such as determined through a player tracking system), determined based on a generated symbol or symbol combination, determined based on a random determination by the central controller, determined based on a random determination at the gaming device, determined based on a weighted parameter, determined based on one or more side wagers placed, determined based on the player's primary game wager, determined based on time (such as the time of day), determined based on an amount of coin-in accumulated in one or more pools, or determined based on events which occur during a primary game, as will be discussed in more detail below.

In one embodiment, the modifiers include multipliers, wherein each payline is associated with a multiplier. In one such embodiment, upon initiation of the free spins game, the gaming device determines initial multiplier values for each of the multipliers associated with the paylines. For example, the gaming device may determine that each of the paylines is associated with a multiplier having an initial multiplier value of 2×. During the free spins game, the 2× multiplier associated with each of the paylines increments in each free spin based on whether or not a win occurs on that particular payline. In this example, each of the paylines is associated with a multiplier having the same initial multiplier value when the free spins game initiates. However, in other embodiments, each or a plurality of the paylines may be associated with multipliers having different initial modifier values.

In different embodiments, the payline multipliers increment by an amount that is predetermined, randomly determined, determined based on the player's status (such as determined through a player tracking system), determined based on a generated symbol or symbol combination, determined based on a random determination by the central controller, determined based on a random determination at the gaming device, determined based on a weighted parameter, determined based on one or more side wagers placed, determined based on the player's primary game wager, determined based on time (such as the time of day), determined based on an amount of coin-in accumulated in one or more pools, or determined in any other suitable manner.

In one embodiment, each time a winning symbol combination is indicated on a payline during the free spins game, the multiplier associated with that payline increments by a predetermined amount. For example, each of the paylines may be associated with a multiplier having an initial multiplier value of 2×, and for each win that occurs on a particular payline, the multiplier associated with that payline increments by one. The gaming device provides a player with a number of free spins of the reels. After the reels generate a plurality of symbols in the first free spin, for each winning symbol combination indicated on the paylines, the player is provided with the award associated with that winning symbol combination multiplied by the 2× multiplier. The multiplier associated with each payline on which a winning symbol combination occurs is incremented by one (i.e., the multiplier increases to 3×), such that the next award achieved on that payline, if any, will be multiplied by 3.

In another embodiment, the multipliers associated with the paylines increment based on the number of symbols in the winning symbol combinations that occur on the paylines. For example, if the winning symbol combination indicated on one of the paylines includes 3 symbols, the multiplier associated with that payline increments by 3. If the winning symbol combination indicated on another one of the paylines includes 4 symbols, the multiplier associated with that payline increments by 4. In other embodiments, the relationship between the number of symbols in the winning symbol combination and the number by which the multiplier increments is not linear or one-to-one. For example, if a winning combination indicated on a payline includes four symbols, the multiplier associated with that payline increments from 1× to 3× (i.e., increments by 2).

In one embodiment, the free spins game of the present disclosure operates in conjunction with a base or primary game operable upon a wager by a player. In one such embodiment, the payline multipliers for the free spins game are determined based on events which occur during play of the primary game. The primary game includes a plurality of reels having a plurality of symbols and a plurality of paylines associated with the reels. Each of the paylines is associated with a multiplier. As a player plays the primary game, the multiplier associated with each payline increments based on events which occur in the primary game. In one example embodiment, when the player begins playing the primary game, each of the paylines is associated with a 1× multiplier. The multiplier increments by one whenever a designated alignment of symbols is achieved on that payline during the primary game. When the free spins game is triggered, such as upon a suitable triggering event, the multipliers that have built up during the primary game are applied to the free spins game. In one such embodiment, if a multiplier reaches a maximum multiplier value during the free spins game, the multiplier remains at that value until the free spin game is triggered, at which time the multiplier will be applied to the free spin game.

It should be appreciated that, in such embodiments, the multipliers that grow or build during the primary game are not applied to awards won in the primary game. Rather, the multipliers take effect once the free spins game is triggered. As the player plays the primary game, the player can see what the multipliers will be when the free spins game is eventually triggered. In one such embodiment, the player must wager the maximum wager amount in the primary game if the player wishes to build multipliers in the primary game which apply to the free spins game.

Once the free spins game is triggered, the gaming device provides the player with a plurality of free spins of the reels. For each of the provided free spins, the reels are activated and the gaming device determines if any winning symbol combinations are indicated on any of the paylines. For each winning symbol combination indicated on each of the paylines, an award associated with that winning symbol combination is provided to the player, wherein the award is modified by the multiplier associated with that payline (i.e., the multiplier that has built in the primary game).

In one such embodiment, once the free spin game is triggered, the multipliers which have built up in the primary game remain at the same multiplier value for each of the free spins in the free spin game. In another embodiment, once the free spins game is triggered, the multipliers that built up during primary game play continue to increment in the free spins. In one such embodiment, for each free spin, the multiplier associated with each payline on which a winning symbol combination occurs is incremented, such that the incremented multiplier is applied to any award generated on that payline in a next free spin of the free spins game.

In one embodiment, at the conclusion of a free spins game, each of the payline multipliers is reset to its initial multiplier value, and the player may resume primary game play. In another embodiment, instead of resetting the multiplier values when one free spins game ends, the multiplier values associated with the paylines are saved from one free spins game to another. Thus, the present disclosure provides payline multipliers which persistent across multiple free spins games. Since it is possible for one or more of the payline multipliers to increase to high levels in each free spins game, there is an incentive for a player to continue playing at the gaming device in hopes of triggering another round of the free spins game.

In one embodiment, there is maximum multiplier value to which each multiplier can grow. In one such embodiment, once the multiplier reaches the maximum multiplier value, the gaming device resets the multiplier to its initial multiplier value. In another embodiment, if a multiplier reaches the maximum multiplier value, the multiplier remains at that value without being reset. In another embodiment, multipliers are reset once they are redeemed.

It is therefore an advantage of the present disclosure to provide a gaming device which provides a free spins game including payline-specific multipliers.

Another advantage of the present disclosure is to provide a gaming device which provides larger awards and greater volatility in the awards in free spins games.

Another advantage of the present disclosure is to provide a gaming device which enables players to recognize the value of the equity they are building during game play.

Additional features and advantages of the present invention are described in, and will be apparent from, the following Detailed Description of the Invention and the figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
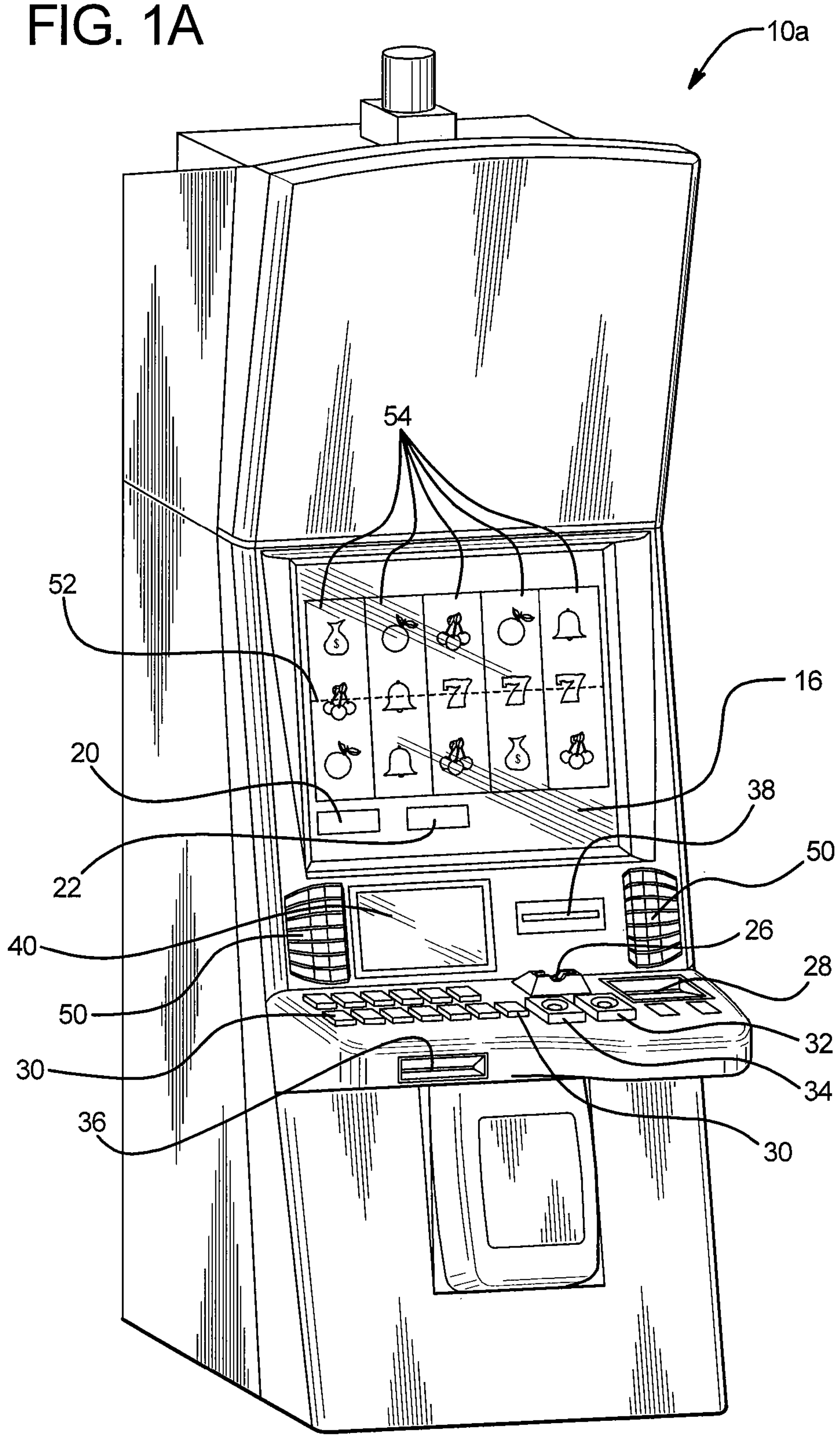
FIGS. 1A and 1B are perspective views of example alternative embodiments of the gaming device of the present disclosure.
Figure 1B:
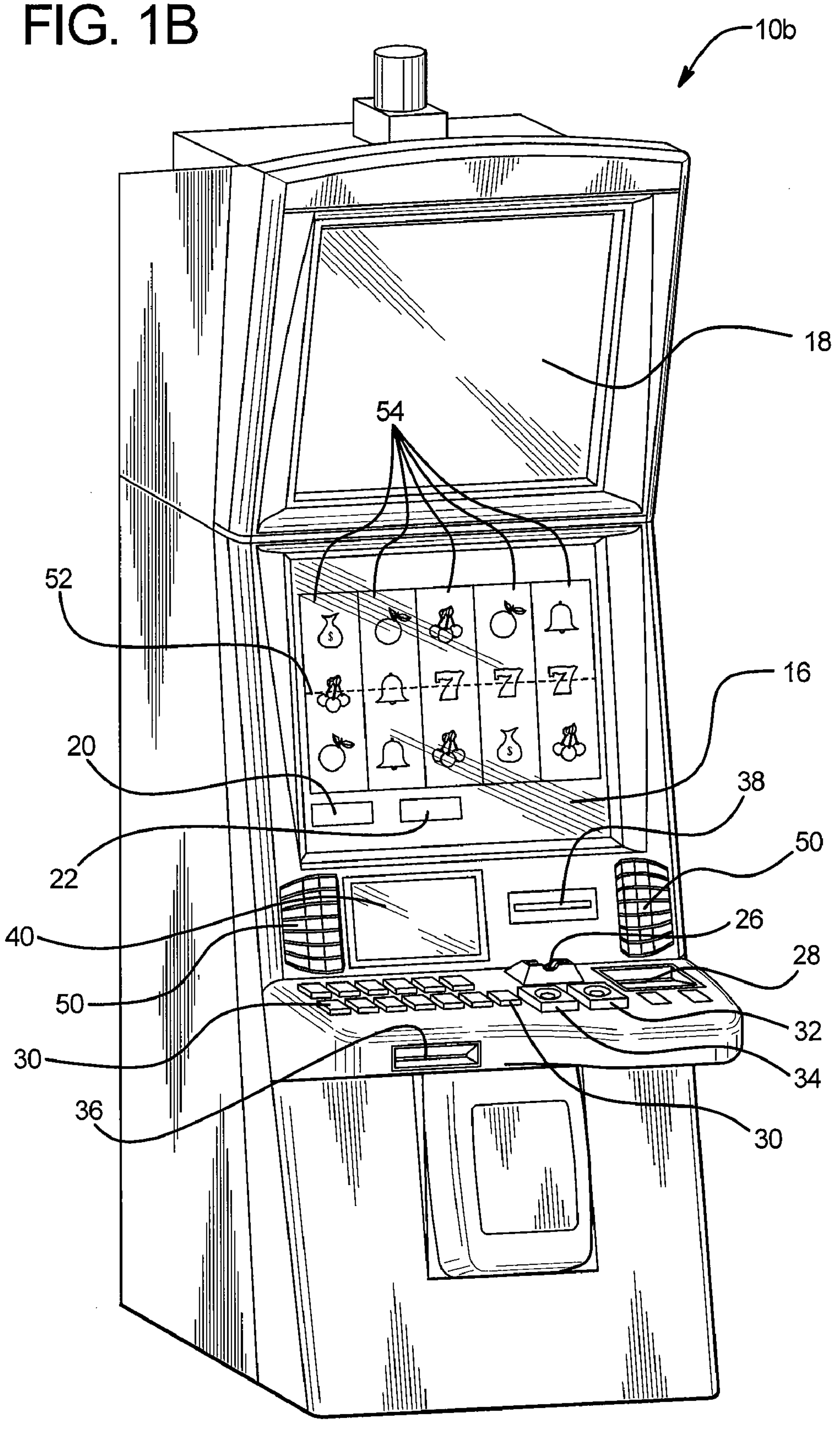

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
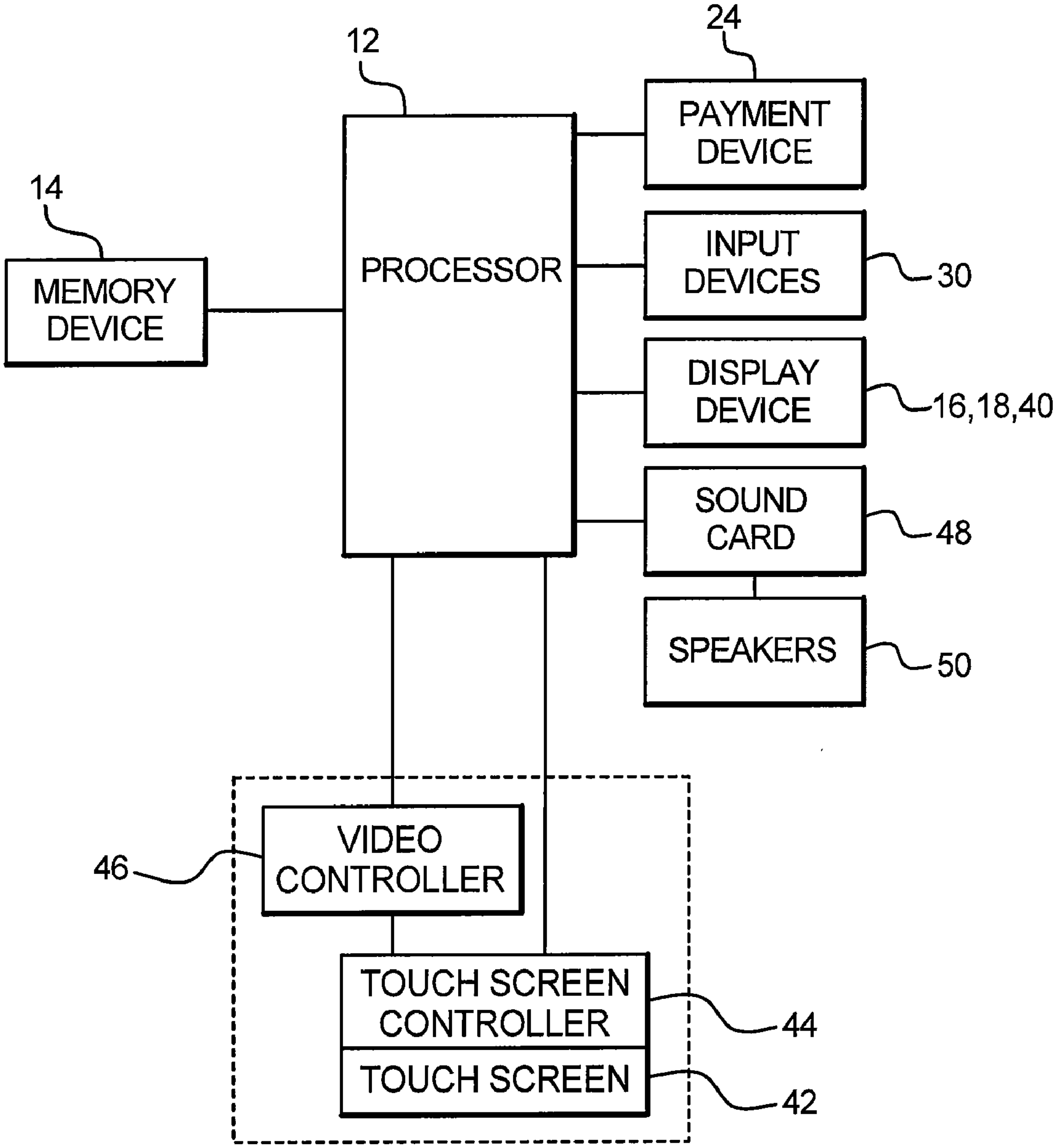
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
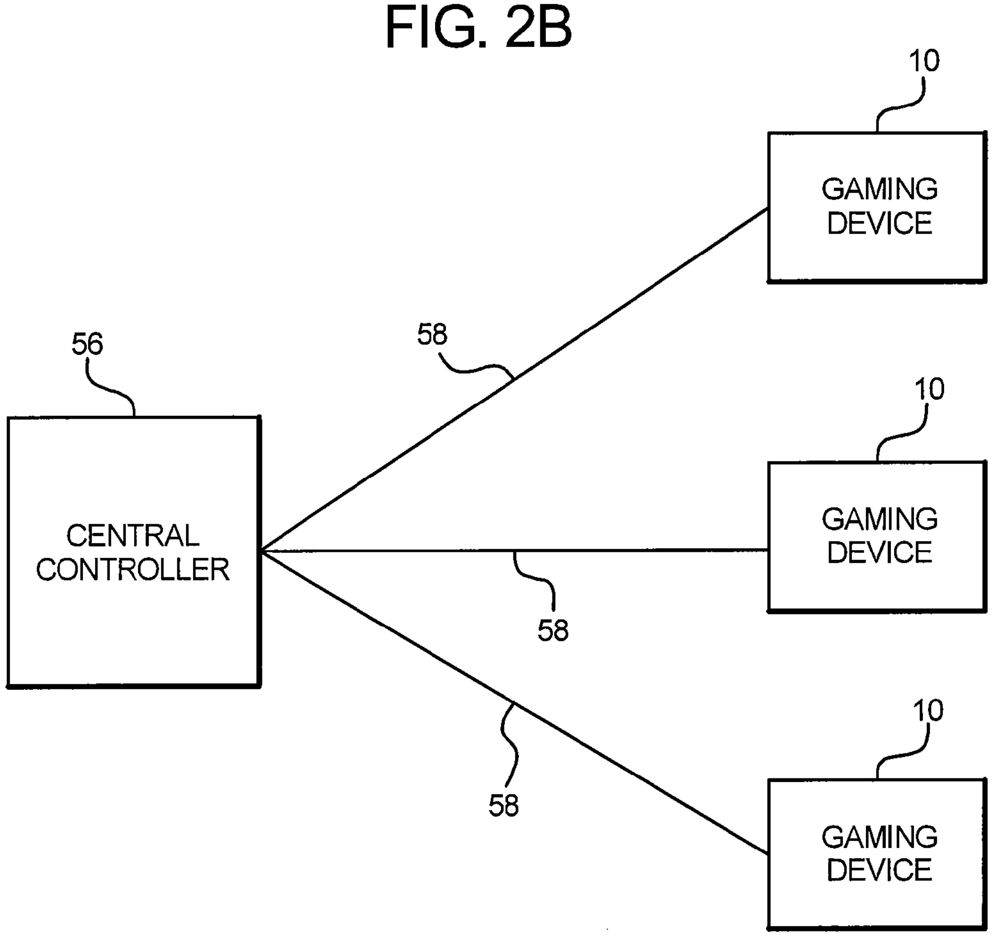
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Free Spins Game with Payline Multipliers

Figure 3:
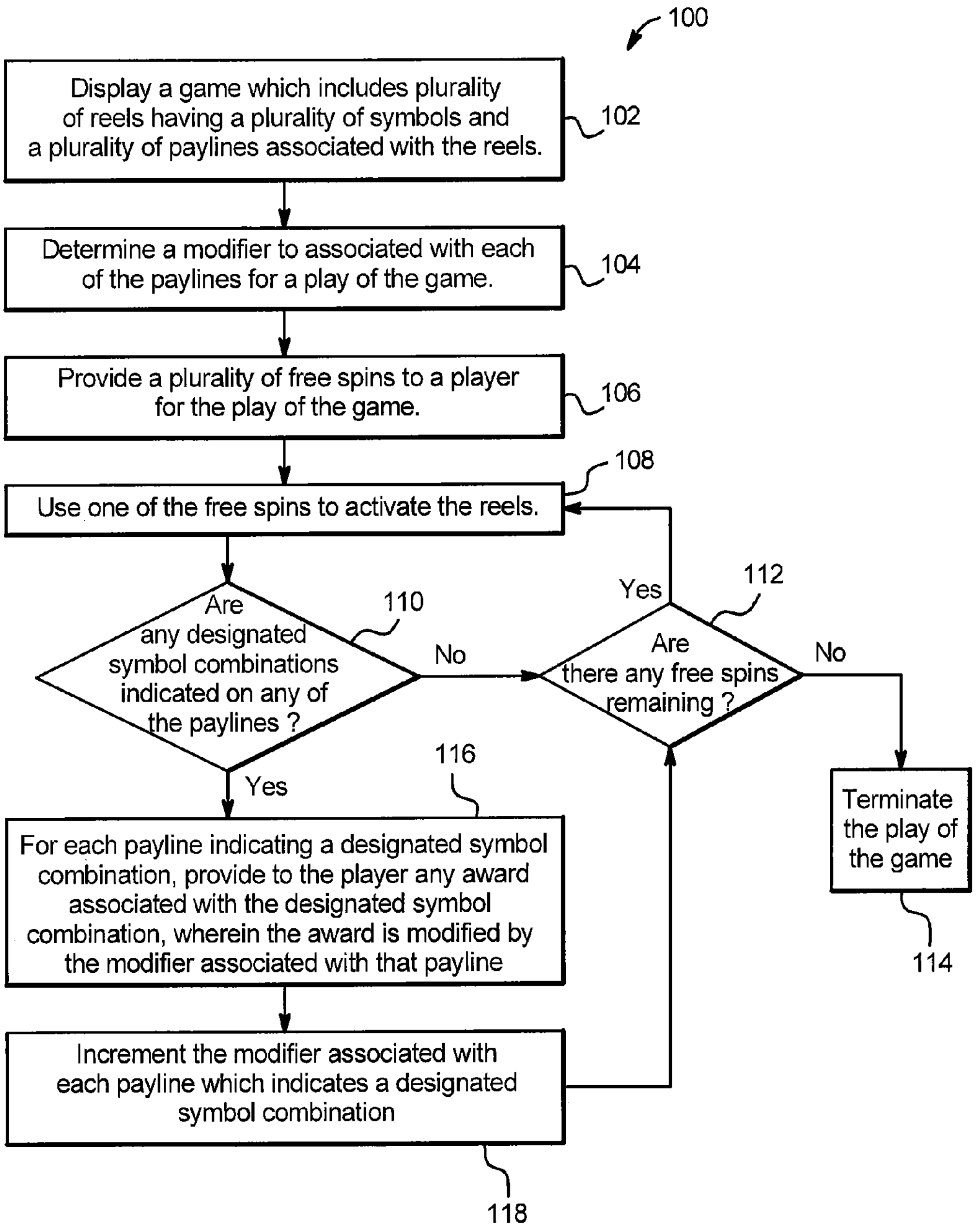
FIG. 3 is a flow chart illustrating one embodiment of the present disclosure.

Referring now to FIG. 3, in one embodiment, the gaming device of the present disclosure operates according to sequence 100. As indicated by block 102, the gaming device displays a game to a player which includes a plurality of reels, a plurality of symbols on the reels, and one or more paylines associated with the reels. Upon initiation of the game, the gaming device determines and displays a plurality of modifiers, one of said modifiers associated with each payline, for application to a free spin game or free activation game, as indicated by block 104. As indicated by block 106, the gaming device provides a plurality of free spins to a player for a play of the game. The number of free spins provided to the player may be predetermined, randomly determined, determined based on the player's wager in a primary or base game, determined based on the player's status (such as determined through a player tracking system), determined based on a generated symbol or symbol combination, determined based on a random determination by the central controller, determined based on a random determination at the gaming device, determined based on a weighted parameter, determined based on one or more side wagers placed, determined based on time (such as the time of day), determined based on an amount of coin-in accumulated in one or more pools, or determined based on any other suitable method or criteria.

As indicated by block 108, the gaming device uses one of the provided free spins to activate the reels. Alternatively, the gaming device enables the player to initiate an activation of the reels. After the reels have spun, the gaming device determines if any designated symbol combinations are indicated on any of the paylines, as indicated by diamond 110. If there are no designated symbol combinations indicated on the paylines after the reels spin, the gaming device determines whether there are any free spins remaining in the play of the game, as indicated by block 112. If there are no free spins remaining, the play of the game terminates, as indicated by block 114. If there are free spins remaining in the play of the game, the gaming device uses another one of the free spins to cause another activation of the reels, as indicated by block 108.

If the gaming device determines, at diamond 110, that one or more designated symbol combinations are indicated on the reels, for each designated symbol combination indicated on each of the paylines, the gaming device provides any award associated with that designated symbol combination to the player, wherein the award is modified by the modifier associated with that payline, as indicated by block 116. After the gaming device provides any awards to the player, the gaming device increments the modifier associated with each payline on which a designated symbol combination occurred, as indicated by block 118. It should be appreciated that, if a designated symbol combination is generated on one of the paylines with an incremented modifier in a next spin of the reels, any award associated with that designated symbol combination will be modified by the incremented modifier.

As indicated by diamond 112, the gaming device determines whether any free spins remain in the game. If there are any free spins remaining in the game, the process continues starting at block 118 until there are no free spins remaining in the game.

Accordingly, in one embodiment, the present disclosure provides a free spins game which includes modifiers that are associated with specific paylines, such that each modifier only modifies awards won on the payline with which it is associated. The modifiers increment in each free spin depending on whether or not a particular payline indicates a designated symbol combination in that free spin. Thus, a player's excitement builds as the player progresses further into the free spins game because the potential for larger awards also builds based on the increasing modifiers.

It should be appreciated that, in various alternative embodiments, the modifiers associated with the paylines may be predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In one embodiment, the modifiers associated with the paylines include multipliers. Referring now to FIGS. 4A, 4B, 4C, 4D, 4E, and 4F, an example of one embodiment of the present disclosure is illustrated wherein each of the paylines is associated with a multiplier. In this example, the gaming device provides the player with 5 free spins in the game. For each free spin, the multiplier associated with each of the paylines increments by one if a winning symbol combination is indicated on that payline.

Figure 4A:
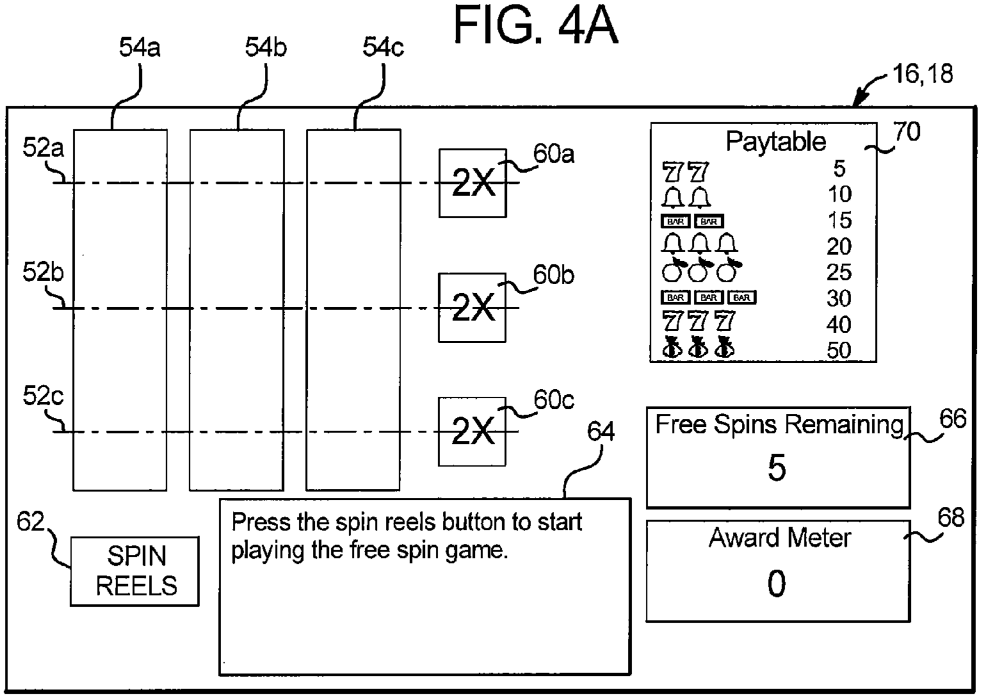
FIGS. 4A, 4B, 4C, 4D, 4E, and 4F are enlarged views of a display illustrating an example free spins game of one embodiment of the present disclosure.

As seen in FIG. 4A, the gaming device displays a game including a plurality of reels 54*a*, 54*b*, and 54*c* and a plurality of paylines 52*a*, 52*b*, and 52*c* associated with the reels. Each of the paylines 52*a*, 52*b*, and 52*c* is associated with a multiplier 60*a*, 60*b*, and 60*c*. Upon initiation of the game, each of the multipliers 60*a*, 60*b*, and 60*c* has an initial multiplier value of 2×. The gaming device further includes a "spin reels" button 62, an award meter 68, and a free spins meter 66. The gaming device displays a paytable 70, showing the winning symbol combinations in the game and the associated award for each winning symbol combination. The gaming device displays a message in message box 64 prompting the player to press the "spin reels" button 62 to start playing the game. The award meter 68 shows a zero, indicating that the player has not yet received an award in the game.

Figure 4B:
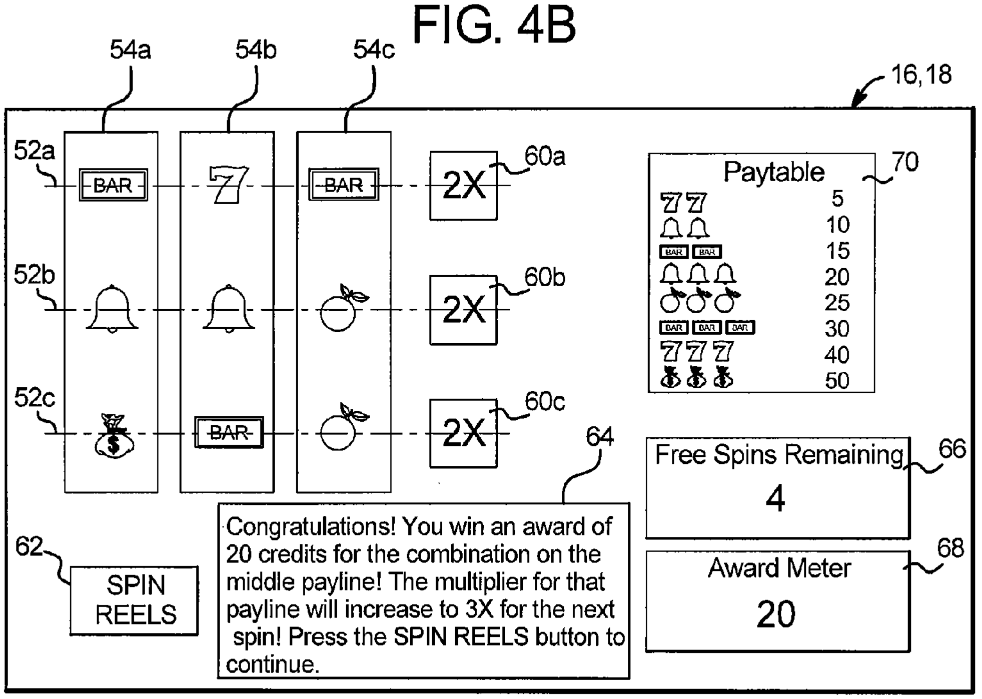

As illustrated in FIG. 4B, after the reels spin for the first time in the game, the gaming device determines whether any winning symbol combinations are indicated along any of the paylines 52*a*, 52*b*, and 52*c*. The middle payline 52*b* indicates a symbol combination which includes two bell symbols. This symbol combination corresponds to an award of 10 credits, according to the paytable 70. The award of 10 credits is modified by the 2× multiplier 60*b* associated with the middle payline 52*b*. Accordingly, the gaming device displays a message in message box 64 indicating that the player wins 20 credits (i.e., 10×2) for the winning symbol combination generated on the middle payline 52*b* and that the payline multiplier 60*b* for that payline will increase to 3× for the next spin. The award meter 68 is updated to indicate that the player has won 20 credits in the first spin of the game. The free spins meter 66 indicates that there are 4 spins remaining in the game.

Figure 4C:
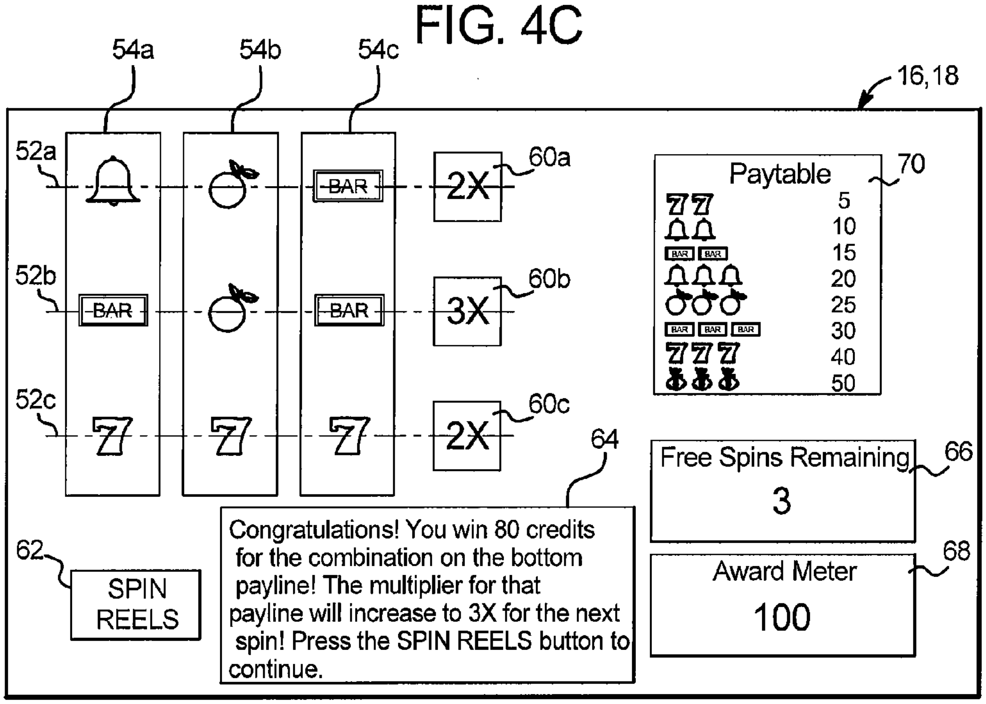

As seen in FIG. 4C, the reels have been activated for the second time in the game, and a winning symbol combination is indicated on the bottom payline 52*c*. Three "7" symbols are indicated on the bottom payline 52*c*, and this symbol combination corresponds to an award of 40 credits according to the paytable 70. The payline multiplier 60*c* associated with the bottom payline is still 2× because this is the first time that a winning symbol combination has occurred on the bottom payline 52*c* in the game. Accordingly, the gaming device displays a message in message box 64 indicating that the player wins 80 credits (i.e., 40×2) for the winning symbol combination generated on the middle payline 52*c* and that the payline multiplier 60*c* for the bottom payline 52*c* will increase to 3× for the next spin. The award meter 68 is updated to indicate that the player has a total of 100 credits in the game. The free spins meter 66 shows that there are 3 spins remaining in the game.

It should be appreciated that, in certain embodiments, if the same set of symbols may be combined for two or more winning symbol combinations, the gaming device will provide the player an award for one of the winning symbol combinations and not each of the winning symbol combinations that the set of symbols may form. For example, if three displayed "7" symbols form a winning symbol combination, the gaming device will provide the player an award for the three displayed "7" symbols, but the gaming device will not provide the player an award for the symbol combinations of two displayed "7" symbols, even though such a two "7" symbol combination may otherwise be a winning symbol combination associated with an award. In certain embodiments, if multiple paylines go through a winning combination of symbols, the gaming device provides awards for each payline that indicates the winning symbol combination. For example, if two paylines go through a winning combination of symbols, the gaming device provides awards for two winning combinations.

Figure 4D:
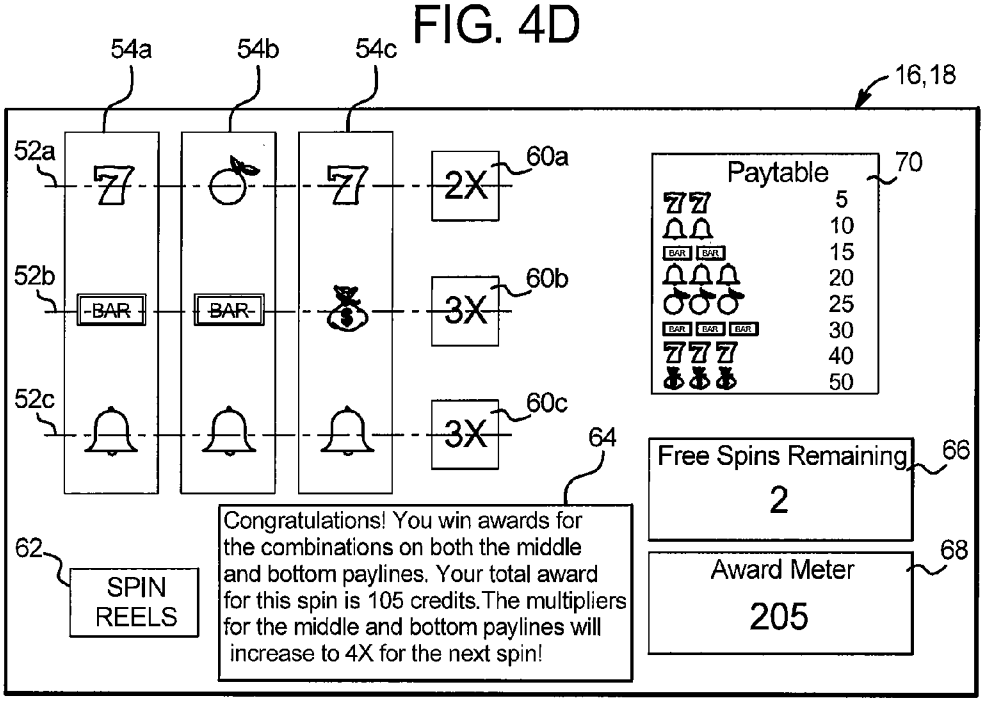

As illustrated in FIG. 4D, a plurality of symbols have been generated on the reels in the third spin of the game. Paylines 52*b* and 52*c* each include a winning symbol combination. The two bar symbols indicated on the middle payline 52*b* correspond to an award of 15 credits according to the paytable 70. The three bell symbols indicated on the bottom payline 52*c* correspond to an award of 20 credits according to the paytable 70. Each of the multipliers associated with these paylines 52*b* and 52*c* has incremented to 3× based on the previous wins which occurred on the paylines 52*b* and 52*c* Accordingly, the gaming device displays a message in message box 64 indicating that the player wins 105 credits (i.e., 15×3+20×3) for the winning symbol combinations generated on the middle and bottom paylines 52*b* and 52*c*, and that the multipliers 60*b* and 60*c* associated with those paylines 52*b* and 52*c* will increment to 4× for the next spin in the game. The award meter 68 is updated to indicate that the player has a total of 205 credits in the game. The free spins meter 66 shows that there are 2 spins remaining in the game.

Figure 4E:
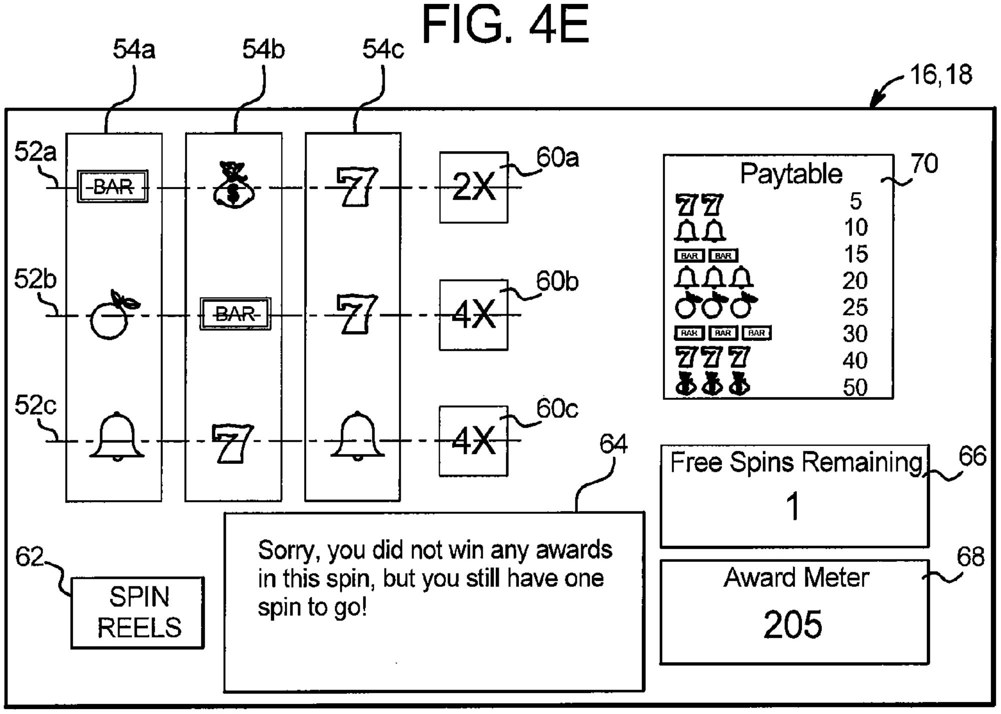

As illustrated in FIG. 4E, the reels have been activated for the fourth spin in the game. None of the paylines 52*a*, 52*b*, and 52*c* indicates a winning symbol combination in this spin. Therefore, the player does not receive any awards, and each of the multipliers 60*a*, 60*b*, and 60*c* associated with the paylines 52*a*, 52*b*, and 52*c* remain at the current multiplier value. The gaming device displays a message in message box 64 indicating that the player does not win an award for this spin. The free spins meter 66 indicates that there is 1 spin remaining in the game.

Figure 4F:
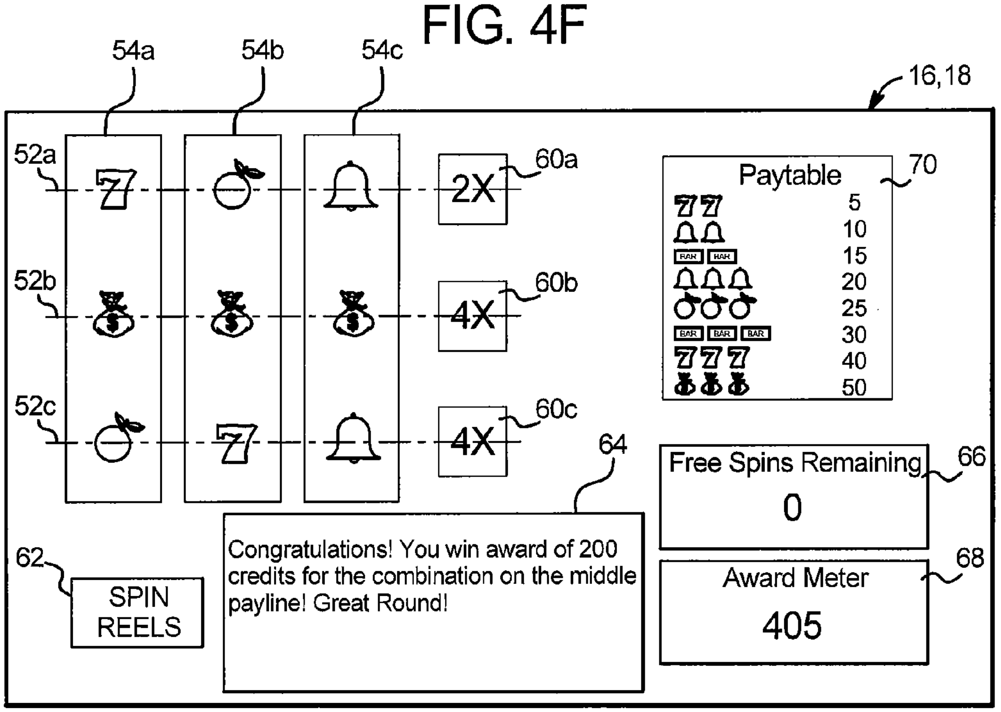

In FIG. 4F, the reels have been activated for the last time in the game. Three money bag symbols are indicated on the middle payline 52*b*, and this symbol combination corresponds to an award of 50 credits according to the paytable 70. The payline multiplier 60*b* associated with the middle payline 52*b* is 4× based on the previous wins achieved on this payline 52*b*. Accordingly, the gaming device displays a message in message box 64 indicating that the player wins 200 credits (i.e., 50×4) for the winning symbol combination generated on the middle payline 52*b*. The award meter 68 is updated to show that the player has won a total of 405 credits in the game. There are no free spins remaining in the game and, therefore, the game ends.

In one embodiment, when there are no free spins remaining in the game, each of the payline multipliers is reset to its initial modifier value. In another embodiment, once a multiplier is used to modify an award, that multiplier is reset to its initial multiplier value. In another embodiment, a maximum multiplier value is established, such that once a payline multiplier reaches the maximum multiplier value during the game, it resets to its initial multiplier value.

Accordingly, the example of FIGS. 4A to 4F shows how incrementing the multiplier associated each of the paylines each time a winning symbol combination is indicated on that payline increases the level of player excitement and enjoyment in the free spins game.

In certain embodiments, instead of or in addition to incrementing payline multipliers when winning symbol combinations occur on the paylines, the gaming device increments the multipliers when non-winning symbol combinations are indicated on the paylines. In other embodiments, the gaming device increments the multiplier associated with each payline when a designated quantity or a designated combination of sub-symbols are indicated on the payline.

Figure 5:
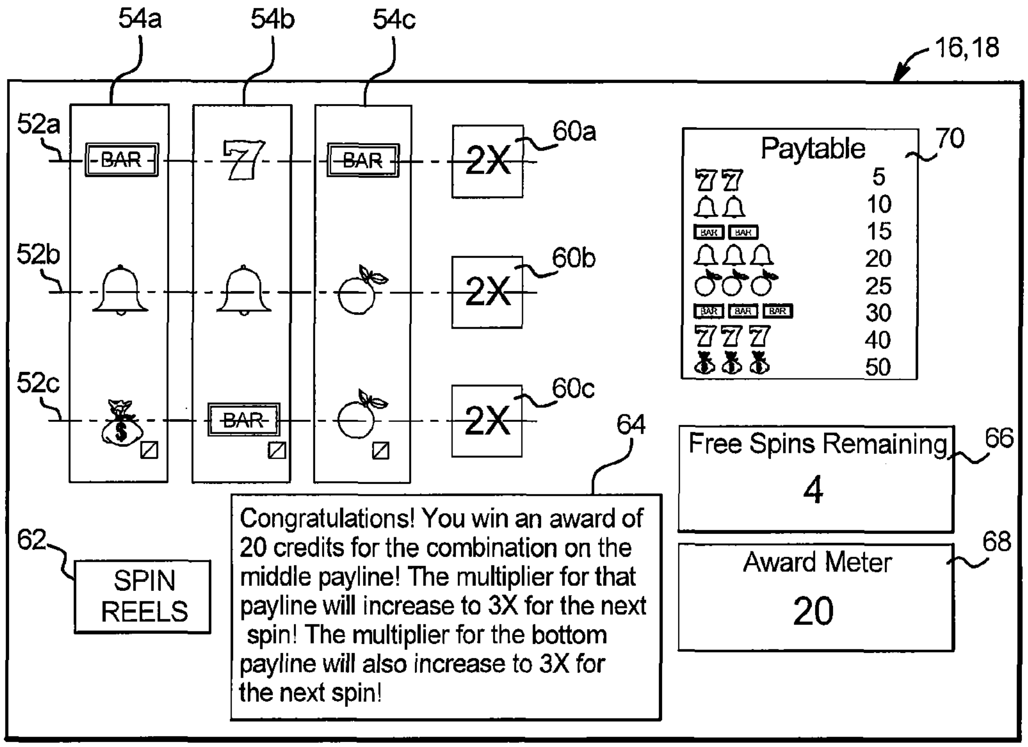
FIG. 5 is an enlarged views of a display illustrating an example of one embodiment of the present disclosure.

For example, as illustrated in FIG. 5, each of the paylines is associated with a multiplier having an initial multiplier value of 2× when the free spin game initiates. In this example, the gaming device provides the player with 5 free spins in the game. For each free spin, the multiplier associated with each of the paylines increments by one if a winning symbol combination is indicated on that payline. Additionally, the multiplier associated with each of the paylines increments by one if each of the symbols indicated along that payline includes a sub-symbol.

FIG. 5 shows the outcome of the first free spin. A winning symbol combination including two bell symbols is indicated on the middle payline 52*b*. This winning symbol combination corresponds to an award of 10 credits, according to the paytable 70. Accordingly, the award meter 68 is updated to indicate that the player has 20 credits (i.e., the award of 10 credits, modified by the 2× multiplier for that payline). Since a winning symbol combination occurred on the middle payline 52*b*, the multiplier for that payline will increment to 3× for the next free spin.

As seen in FIG. 5, the bottom payline 52*c* does not include a winning symbol combination. However, each of the symbols indicated on the bottom payline 52*c* includes a sub-symbol. Thus, the multiplier associated with the bottom payline 52*c* will also increment to 3× for the next free spin. Even though the player did not receive an award for the combination indicated on the bottom payline 52*c*, the player now has the potential to win larger awards if any winning symbol combinations are generated on that payline in any subsequent free spins.

It should be appreciated that the payline multipliers may increment by any suitable amount in the free spins game. In different embodiments, one or more of the multipliers increment by amounts that are predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

For example, FIGS. 6A, 6B, 6C, and 6D illustrate one embodiment of the free spins game of the present disclosure where, for each winning symbol combination indicated on each payline, the multiplier associated with that payline increments based on the number of symbols in the winning symbol combination which occurs on that payline.

Figure 6A:
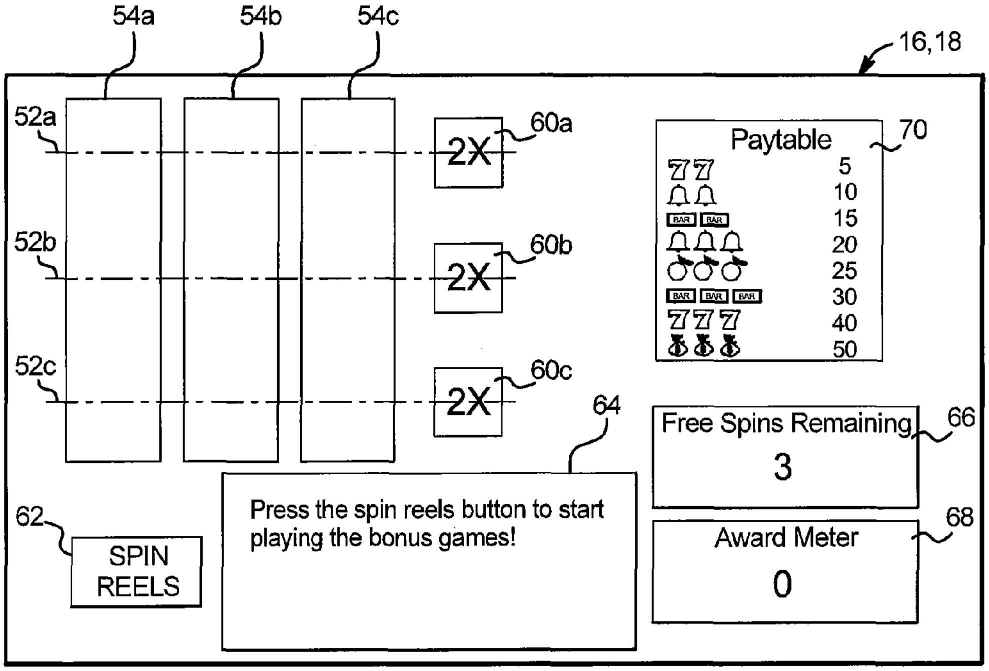
FIGS. 6A, 6B, 6C, and 6D are enlarged views of a display illustrating an example free spins game of another embodiment of the present disclosure.

As seen in FIG. 6A, each of the multipliers 60*a*, 60*b*, and 60*c* associated with the paylines 52*a*, 52*b*, and 52*c* has an initial multiplier value of 2× at the beginning of the game. The gaming device provides 3 free spins of the reels for this play of the game, as indicated by the spins remaining display 66. The gaming device displays a message in message box 64 prompting the player to press the "spin reels" button 62 to start playing the game. The award meter 68 shows a zero, indicating that the player has not yet received an award.

Figure 6B:
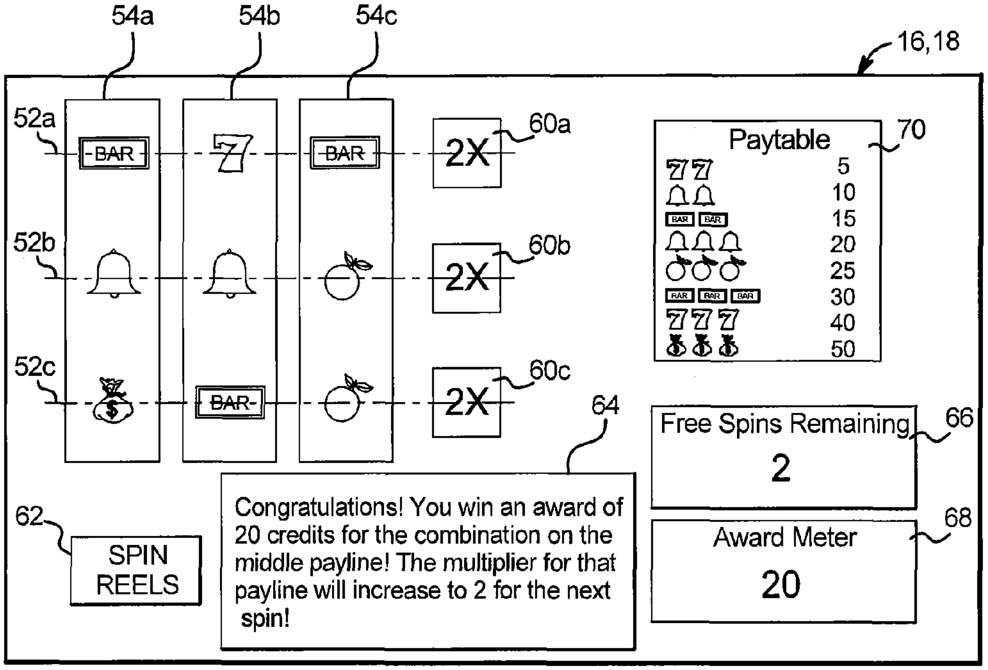

In FIG. 6B, after the reels spin for the first time in the game, the gaming device determines whether any winning symbol combinations are indicated along any of the paylines 52*a*, 52*b*, and 52*c*. The middle payline 52*b* indicates a symbol combination which includes two bell symbols. This symbol combination corresponds to an award of 10 credits, according to the paytable 70. The award of 10 credits is modified by the 2× multiplier 60*b* associated with the middle payline 52*b*. Accordingly, the gaming device displays a message in message box 64 indicating that the player wins 20 credits (i.e., 10×2) for the winning symbol combination generated on the middle payline 52*b*. Since the winning symbol combination includes two symbols, the payline multiplier 60*b* for that payline 52*b* will increase by 2 for the next spin. In other words, a 4× multiplier will be applied to the next award generated on the middle payline 52*b* in the game. The award meter 68 is updated to show that the player has won 20 credits in the first spin of the game. The free spins meter 66 includes the number 2, indicating that there are 2 spins remaining in the game.

Figure 6C:
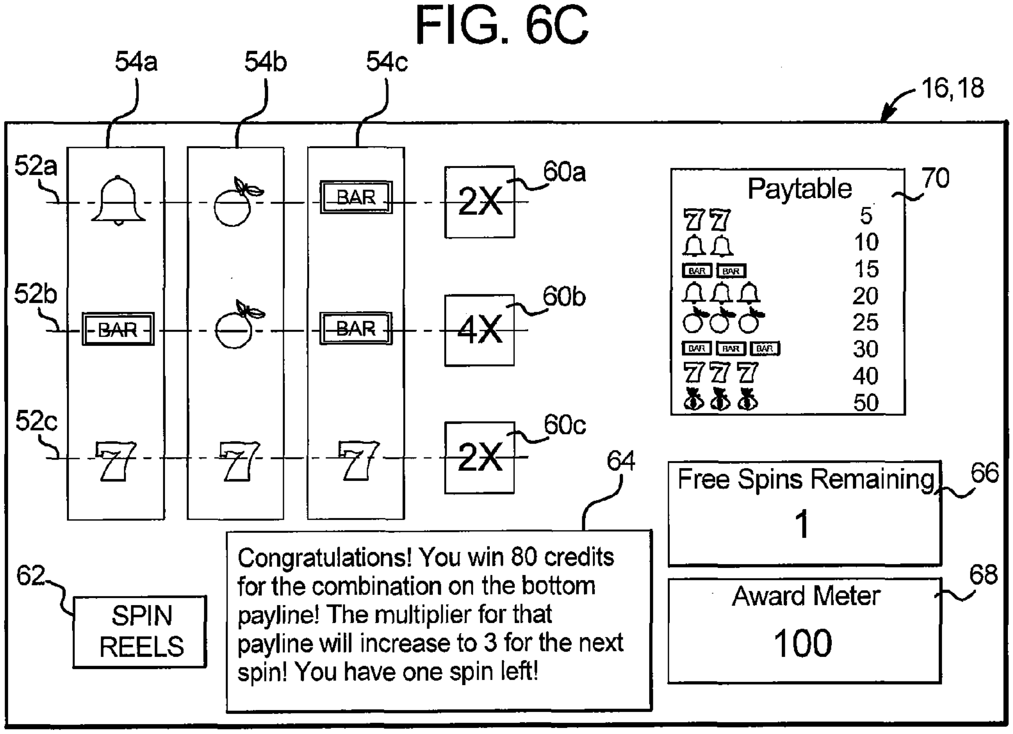

As illustrated in FIG. 6C, the reels have been activated for the second spin in the game, and a winning symbol combination is indicated on the bottom payline 52*c*. Three "7" symbols are indicated on the bottom payline 52*c*, and this symbol combination corresponds to an award of 40 credits according to the paytable 70. The payline multiplier 60*c* associated with the bottom payline is still 2× because this is the first time that a winning symbol combination has occurred on the bottom payline 52*c* in the game. Accordingly, the gaming device displays a message in message box 64 indicating that the player wins 80 credits (i.e., 40×2) for the winning symbol combination generated on the middle payline 52*c*. Since the winning symbol combination includes three symbols, the payline multiplier 60*c* for that payline 52*c* will increase by 3 for the next spin. In other words, a 5× multiplier will be applied to the next award generated on the bottom payline 52*c* in the game. The award meter 68 is updated to show that the player has a total of 100 credits in the game. The free spins meter 66 indicates that there is one spin remaining in the game.

Figure 6D:
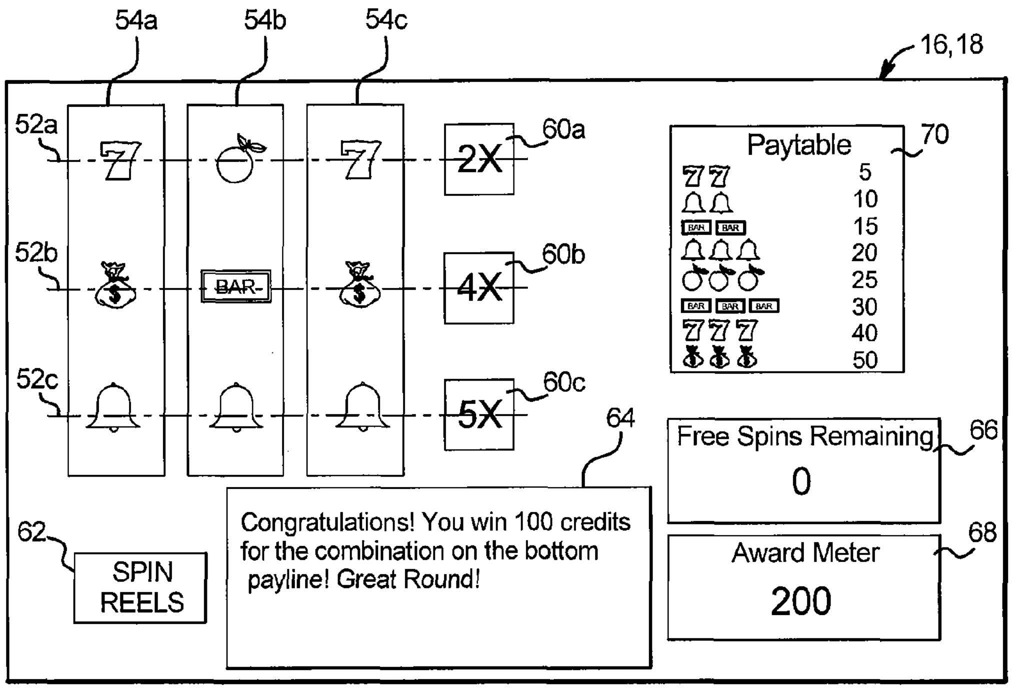

As seen in FIG. 6D, the reels have been activated for the last time in the game. Three bell symbols are indicated on the bottom payline 52*c*, and this symbol combination corresponds to an award of 20 credits according to the paytable 70. The payline multiplier 60*b* associated with the middle payline 52*b* is 5× based on the win achieved on this payline in the previous spin. Accordingly, the gaming device displays a message in message box 64 indicating that the player wins 100 credits (i.e., 20×5) for the winning symbol combination generated on the bottom payline 52*c*. The award meter 68 is updated to show that the player has won a total of 200 credits in the game. There are no free spins remaining in the game and, therefore, the game ends.

In one alternative embodiment of the present disclosure, rather than incrementing the multiplier associated with a payline when a winning symbol combination occurs on that payline, the multiplier increments when a non-winning symbol combination is indicated on the payline. In one example of such an embodiment, upon initiation of the free spins game, each of the multipliers associated with the paylines has an initial multiplier value of 1×. In each free spin, the multiplier associated with each payline indicating a non-winning symbol combination is incremented. For each payline which indicates a winning symbol combination, the gaming device provides an award to the player, wherein the award is modified by the current multiplier for that payline. After the award is paid to the player for each payline win, the multiplier value for each payline on which a winning symbol combination occurred is reset to the initial multiplier value of 1×. This continues until there are no free spins remaining in the game.

In a further alternative embodiment, the free spins game of the present disclosure operates in conjunction with a base or primary game operable upon a wager by a player. The payline multipliers for the free spins game are determined based on events which occur during the primary or base game. In one such embodiment, the primary or base game is associated with a plurality of reels having a plurality of symbols and a plurality of paylines associated with the reels. When a player begins playing the primary game, each of the paylines is associated with a multiplier having an initial multiplier value. As the player plays the primary game, the multiplier associated with each payline increments based on events which occur in the primary game. For example, when a player begins playing the primary game, each of the paylines is associated with a multiplier having an initial multiplier value of 1×. The 1× multiplier increments by one whenever a designated alignment of symbols or a designated alignment of sub-symbols is achieved on that payline during the primary game. It should be appreciated that any suitable type of event or condition may cause the gaming device to increment the multipliers associated with one or more of the paylines. When the free spins game is triggered, such as upon a suitable triggering event, the gaming device provides the player with a plurality of free spins of the reels, and the payline multipliers that have built up during the primary game are applied to the paylines in the free spins game.

In such embodiments, a player can watch the multipliers grow during the primary game and can see what the multipliers will be when the free spins game is eventually triggered. However, the multipliers which build during the primary game are not applied to awards won in the primary game. Rather, the multipliers take effect once the free spins game is triggered. If a player plays the primary game long enough to trigger the free spins game, the player can redeem the equity he or she has built by playing the primary game.

Once the free spins game is triggered, the gaming device provides the player with a plurality of free spins of the reels. For each of the provided free spins, the reels are activated and the gaming device determines if any winning symbol combinations are indicated on any of the paylines. For each winning symbol combination indicated on each of the paylines, an award associated with that winning symbol combination is provided to the player, wherein the award is modified by the multiplier associated with that payline.

In one such embodiment, once the free spin game is triggered, the multipliers which have built up in the primary game remain at the same multiplier value for each of the free spins in the free spin game. In another embodiment, the multipliers that built up during primary game play continue to increment in the free spins. In one such embodiment, for each free spin, the multiplier associated with each payline on which a winning symbol combination occurs is incremented, such that the incremented multiplier is applied to any award generated on that payline in a next free spin of the free spins game.

In one embodiment, the free spins game is triggered when a designated free spin trigger, such as a designated symbol or combination of symbols, occurs on one of the paylines in the primary game. In one such embodiment, when the designated free spin trigger occurs, each of the payline multipliers for the free spins game will be set at the current multiplier value associated with the payline on which the free spin trigger occurred.

In another embodiment, when the free spins game is triggered, the gaming device determines which payline multiplier has grown to the highest multiplier value during primary game play. The gaming device applies the multiplier having the highest multiplier value to each of the paylines for the free spins game. For example, a primary game includes three paylines—Payline 1, Payline 2, and Payline 3. When the free spins game is triggered, the multipliers associated with Payline 1, Payline 2, and Payline 3 have built up to 3×, 4×, and 5×, respectively, based on events occurring during the primary game. Each of the paylines in the free spins game will be associated with a multiplier having a multiplier value of 5× (i.e., the highest multiplier value from the primary game).

In another embodiment, the gaming device determines the sum of all the payline multipliers that have built up during primary game play and applies a multiplier equal to the sum of all the payline multipliers to each of the paylines in the free spins game. Using the example above, when the free spins game is triggered, the multipliers associated with Payline 1, Payline 2, and Payline 3 have built up to 3×, 4×, and 5×, respectively, based on events occurring during the primary game. The sum of the payline multipliers that have built up during the primary game is 12× (i.e., 3×+4×+5×). In the free spins game, each of the paylines will be associated with a modifier of 12×. In one embodiment, there are limits as to how high modifiers can grow. That is, the multipliers are capped such that they cannot exceed certain values. In such embodiments, when a multiplier reaches the cap or the maximum value, it resets to its initial modifier value.

Figure 7A:
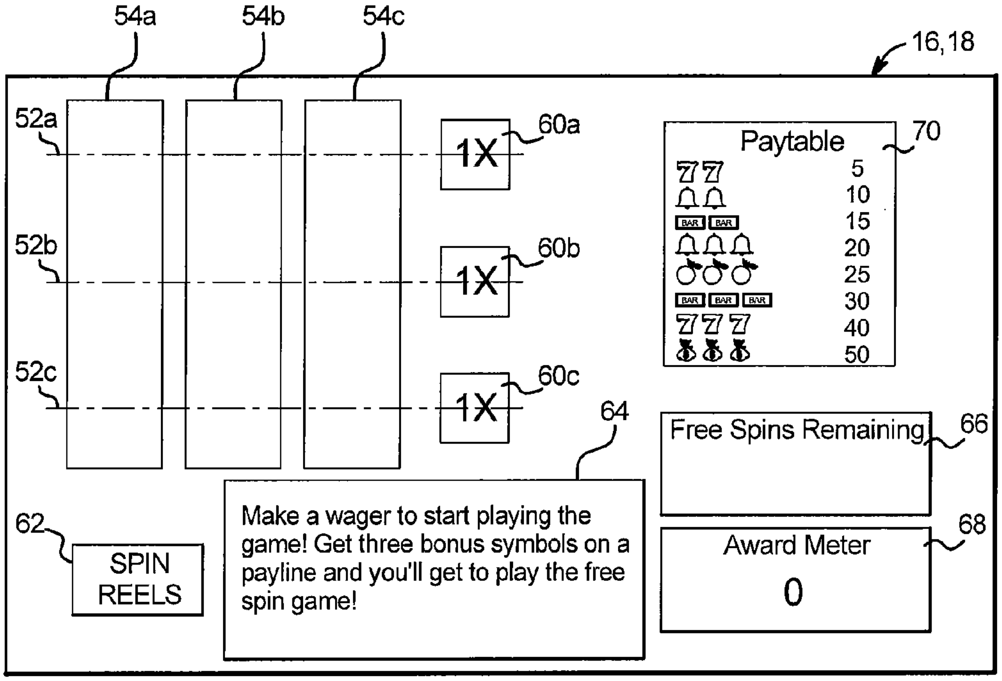
FIGS. 7A, 7B, 7C, 7D, 7E, 7F, 7G, and 7H are enlarged views of a display illustrating one example embodiment of the present disclosure, wherein the multipliers for a free spins game build in a primary game.

FIGS. 7A, 7B, 7C, 7D, 7E, 7F, 7G, and 7H illustrate one example embodiment of the present disclosure where the payline multipliers build during play of a primary game. As seen in FIG. 7A, the gaming device displays a message in message box 64 prompting the player to make a wager to initiate a play of the primary game. Each of the multipliers 60*a*, 60*b*, and 60*c* associated with the paylines 52*a*, 52*b*, and 52*c* has an initial multiplier value of 1× when the player begins playing the primary game. The award meter 68 shows a zero, indicating that the player has not yet won an award.

Figure 7B:
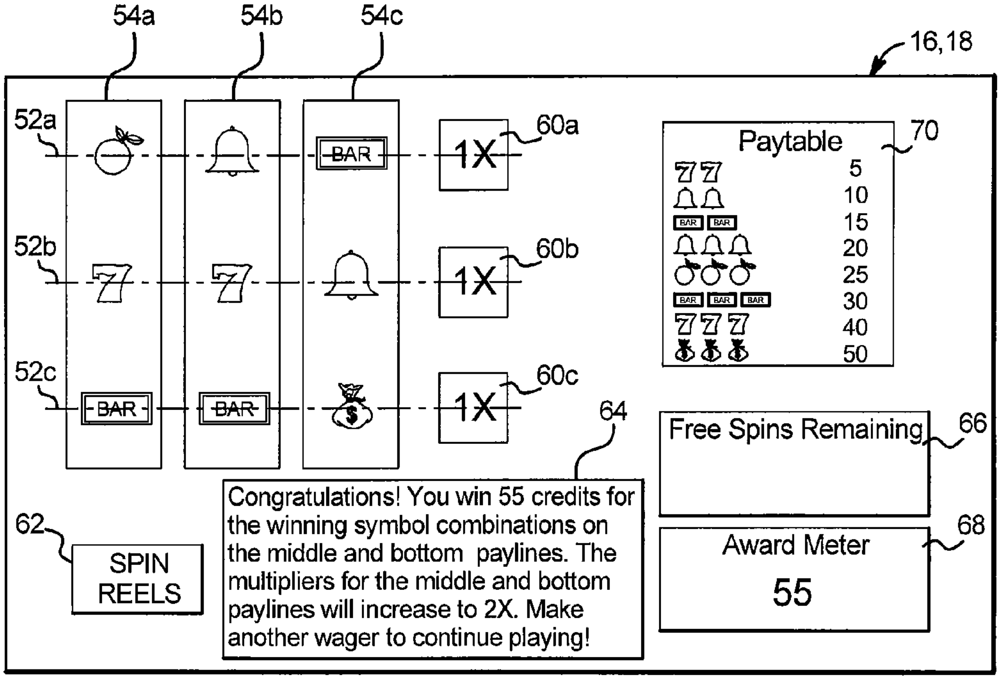

In FIG. 7B, the reels spin, and the gaming device determines whether any winning symbol combinations are indicated along any of the paylines 52*a*, 52*b*, and 52*c*. The middle payline 52*b* indicates a symbol combination which includes three “7” symbols. This symbol combination corresponds to an award of 40 credits, according to the paytable 70. The bottom payline 52*c* indicates a symbol combination which includes two bar symbols. This symbol combination corresponds to an award of 15 credits, according to the paytable 70. Accordingly, the gaming device displays a message in message box 64 indicating that the player wins 55 credits (i.e., 40+15) for the winning symbol combinations generated on the middle and bottom paylines 52*b* and 52*c*. The award meter 68 is updated to show that the player has won 55 credits in the first spin. The multipliers 60*b* and 60*c* associated with the middle and bottom paylines 52*b* and 52*c* increase to 2×. The multiplier associated with the top payline 52*a* is still 1× since the top payline 52*a* did not indicate a winning symbol combination in this spin.

Figure 7C:
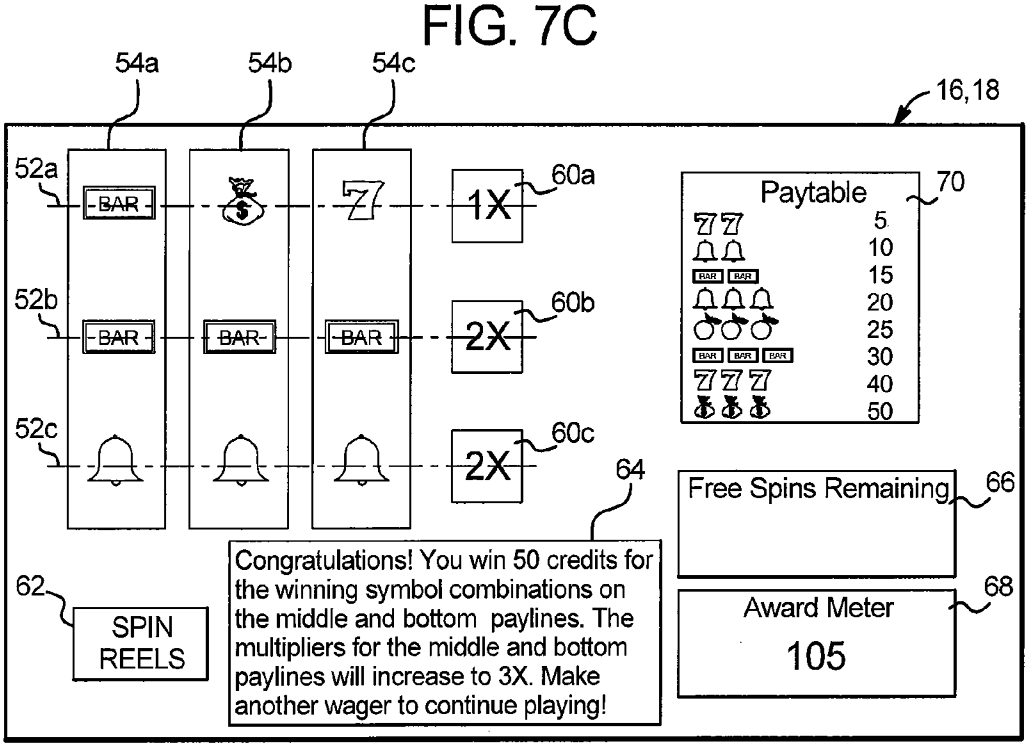

As seen in FIG. 7C, the reels spin for the second time. The gaming device determines whether any winning symbol combinations are indicated on the paylines 52*a*, 52*b*, and 52*c*. The middle payline 52*b* indicates three bar symbols, which corresponds to an award of 30 credits according to the paytable 70. The bottom payline 52*c* indicates three bell symbols, which corresponds to an award of 20 credits. Accordingly, the gaming device displays a message in message box 64 indicating that the player wins 50 credits (i.e., 30+20) for the winning symbol combinations generated on the middle and bottom paylines 52*b* and 52*c*. The award meter 68 is updated to show that the player has won a total of 105 credits during play of the primary game. Although the multipliers 60*b* and 60*c* associated with the middle and bottom paylines 52*b* and 52*c* are currently 2×, the awards provided to the player based on the winning symbol combinations generated on these paylines are not modified by the 2× multipliers. Nevertheless, each of the multipliers 60*b* and 60*c* associated with the middle and bottom paylines 52*b* increases to 3×. The 3× multipliers will take effect in the free spins game, if the free spins game is triggered.

Figure 7D:
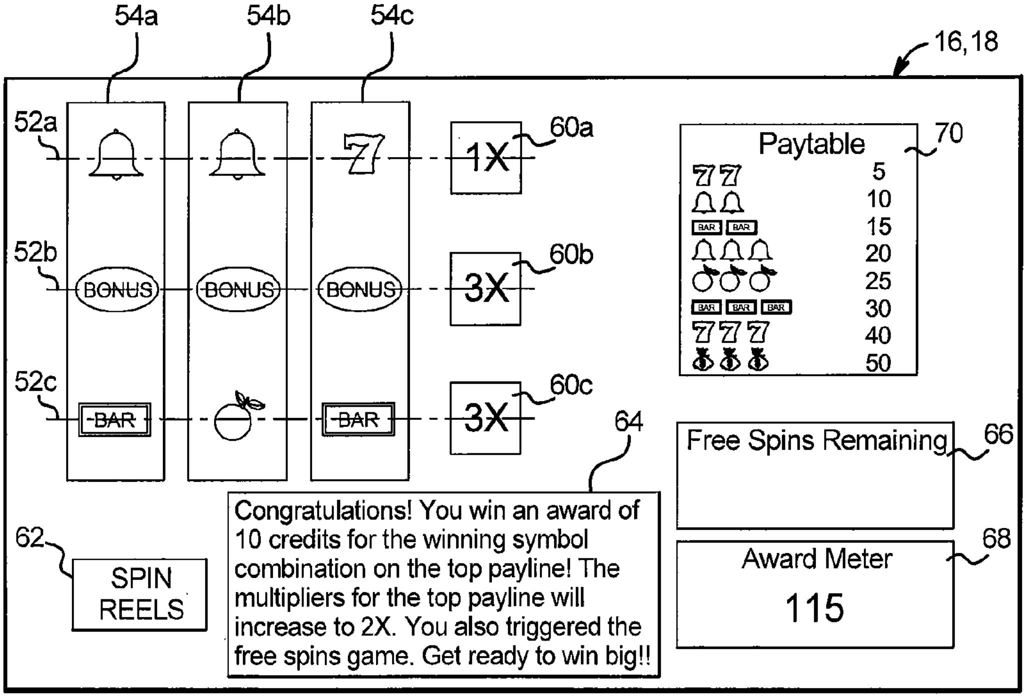

In FIG. 7D, the player initiates a third play of the primary game, and the reels spin for the third time. The gaming device determines whether any winning symbol combinations are indicated along any of the paylines 52*a*, 52*b*, and 52*c*. The top payline 52*a* indicates a winning symbol combination including two bell symbols. This symbol combination corresponds to an award of 10 credits according to the paytable 70. The gaming device displays a message in message box 64 indicating that the player wins 10 credits for the winning symbol combination generated on the top payline 52*a*. The award meter 68 is updated to show that the player has won a total of 115 credits during play of the primary game. The multiplier associated with the top payline 52*a* increases to 2× because a winning symbol combination was indicated on that payline. Additionally, three bonus symbols are indicated on the middle payline 52*b*. This is the triggering event for the free spins game.

Figure 7E:
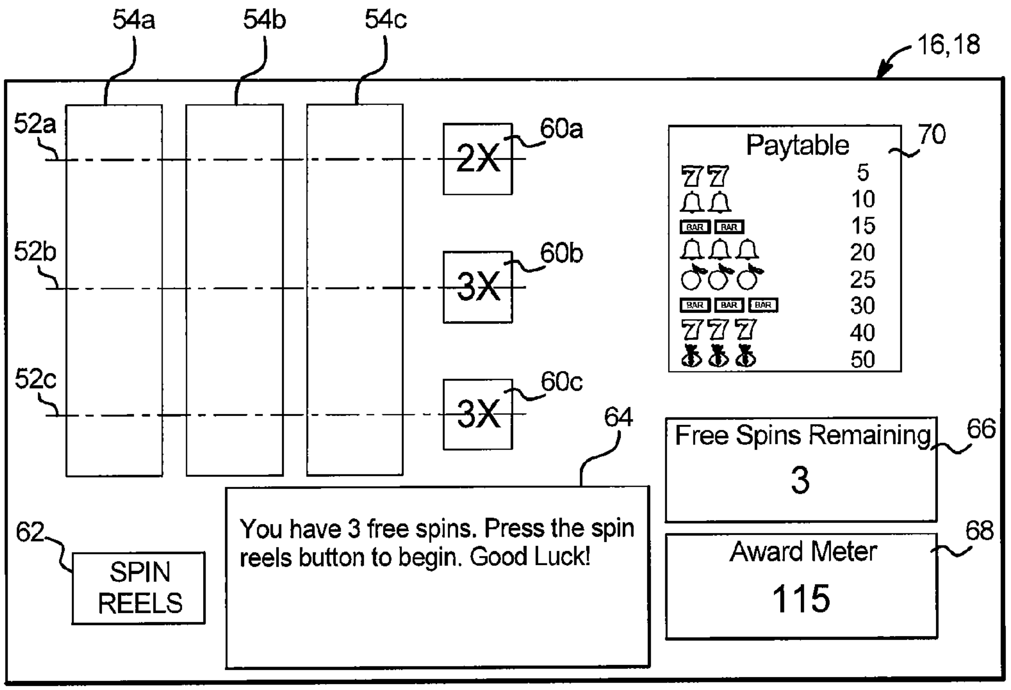

As illustrated in FIG. 7E, the gaming device provides 3 free spins of the reels in the free spins game, as indicated in the spins remaining display 66. The gaming device displays a message in message box 64 prompting the player to press the spin reels button to cause an activation of the reels.

Figure 7F:
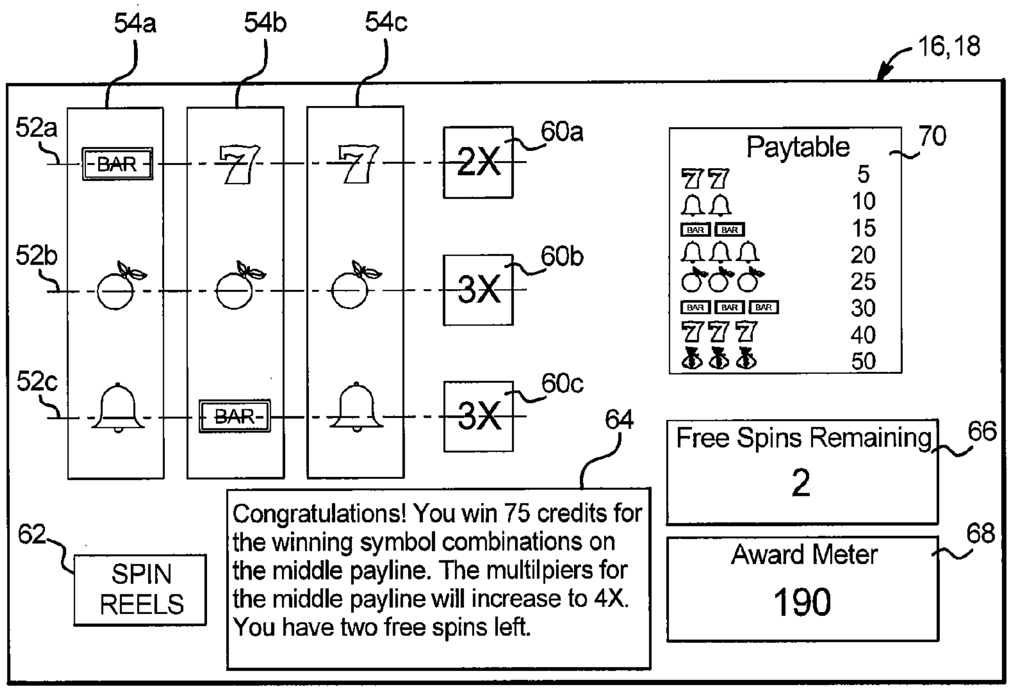

As seen in FIG. 7F, the first free spin results in a winning symbol combination indicated on the middle payline 52*b*. The middle payline 52*b* displays three orange symbols, and this symbol combination corresponds to an award of 25 credits according to the paytable 70. Since the player is now playing the free spins game, the multiplier 60*b* associated with the middle payline 52*b* modifies the award won on that payline. Accordingly, the gaming device displays a message in message box 64 indicating that the player wins 75 credits (i.e., 25×3) for the winning symbol combination generated on the middle payline 52*b*. The award meter 68 shows the number 190 because the player has won a total of 190 credits during the gaming session. The multiplier 60*b* associated with the middle payline 52*b* increments to 4× for the next free spin. The player has two free spins remaining in the free spins game, as indicated by the free spins remaining display 66.

Figure 7G:
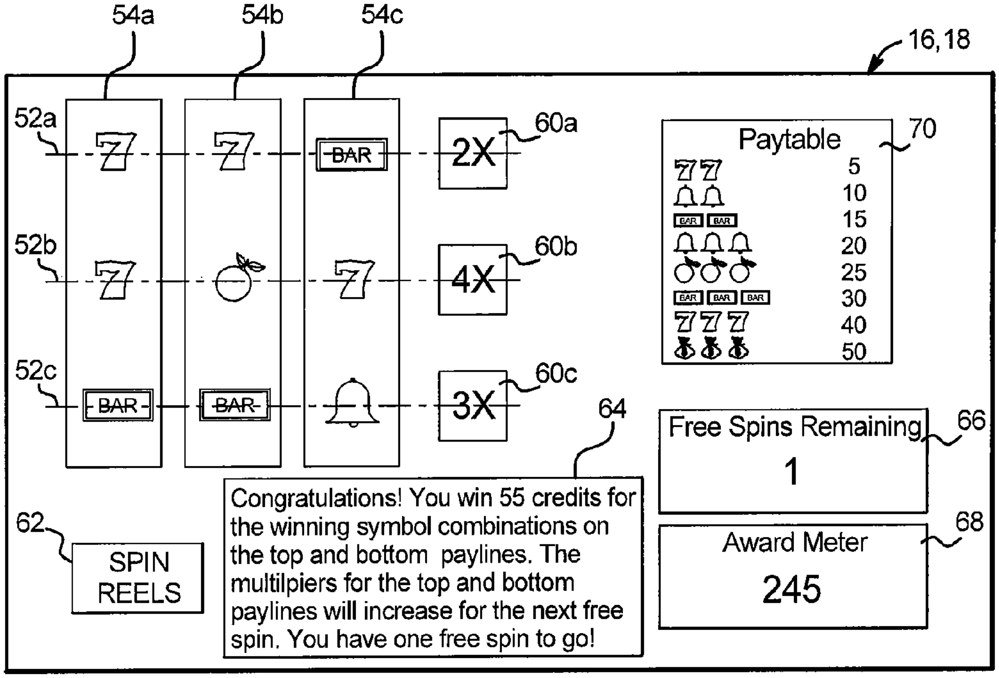

In FIG. 7G, the reels spin for the second time in the free spins game, and winning symbol combinations are indicated on the top and bottom paylines 52*a* and 52*c*. The top payline 52*a* indicates a symbol combination including two “7” symbols, which corresponds to an award of 5 credits according to the paytable 70. The bottom payline 52*c* indicates a symbol combination including two bar symbols, which corresponds to an award of 15 credits according to the paytable 70. The multipliers 60$a$ and 60$c$ associated with the top and bottom paylines 52$a$ and 52$c$ are 2× and 3×, respectively. Accordingly, the gaming device displays a message in message box 64 indicating that the player wins 55 credits (i.e., 5×2+15×3) for the winning symbol combinations generated on the top and bottom paylines 52$a$ and 52$c$. The award meter 68 indicates that the player has won a total of 245 credits during this gaming session. The multipliers 60$a$ and 60$c$ associated with the top and bottom paylines 52$a$ and 52$c$ increment to 3× and 4×, respectively, for the next free spin. The player has one free spin remaining in the free spins game, as indicated by the free spins remaining display 66.

Figure 7H:
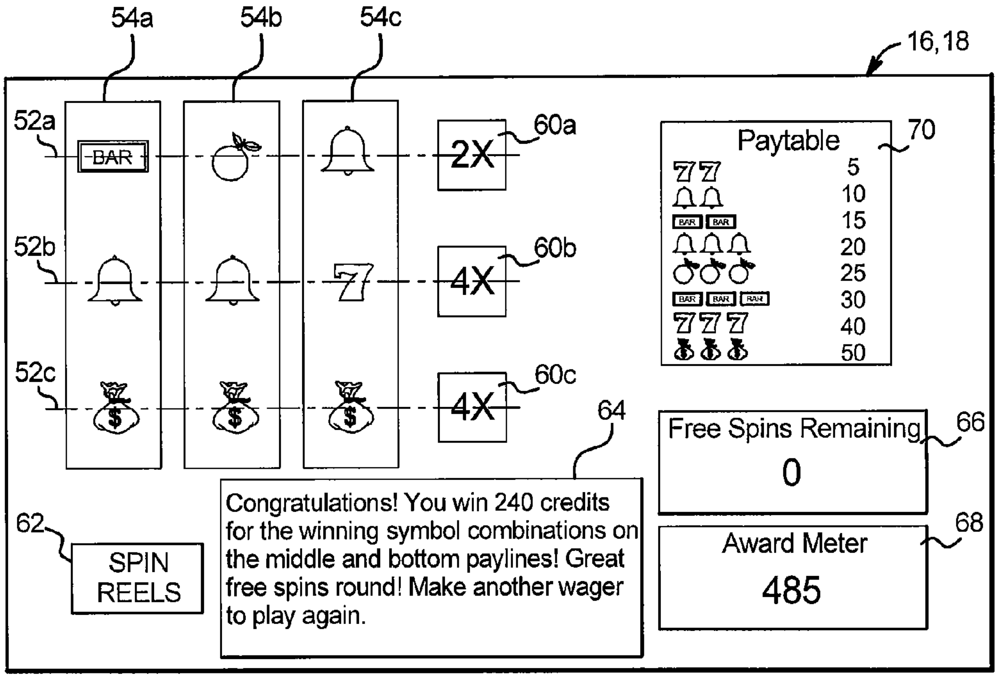

In FIG. 7H, the reels spin for the last time in the free spins game, and winning symbol combinations are indicated on the middle and bottom paylines 52$b$ and 52$c$. The two bell symbols indicated on the middle payline 52$b$ correspond to an award of 10 credits according to the paytable 70. The three money bag symbols indicated on the bottom payline 52$c$ correspond to an award of 50 credits according to the paytable 70. The multipliers 60$b$ and 60$c$ associated with the middle and bottom paylines 52$b$ and 52$c$ are each 4×. Accordingly, the gaming device displays a message in message box 64 indicating that the player wins 240 credits (i.e., 10×4+50×4) for the winning symbol combinations generated on the middle and bottom paylines 52$b$ and 52$c$. The award meter 68 is updated to show that the player has won a total of 485 credits during this gaming session. As indicated by the free spins remaining display 66, there are no free spins remaining and, therefore, the free spins game ends. The gaming device displays a message to the player in message box 64 prompting the player to make another wager if the player wishes to initiate another play of the primary game.

The example of FIGS. 7A to 7H demonstrates how the multipliers that build in the primary game can continue to increment or increase in the free spins game. In such embodiments, a player has the opportunity to obtain increasingly larger awards as the player progresses in the free spins game. It should be appreciated that in other embodiments, once the free spin game is triggered, the multipliers which have built up in the primary game remain at that multiplier value for each of the free spins of the free spin game.

It should also be appreciated that, in the example of FIGS. 7A to 7H, the reels are the same for both the primary game and the free spins game. However, in different embodiments, the primary game reels and the free spin or bonus game reels may be different. In one such embodiment, each payline associated with the bonus game reels corresponds to one of the paylines associated with the primary game reels. Each of the primary game paylines is associated with a multiplier which builds during play of the primary game. In one such embodiment, once the bonus game is triggered, such as upon a suitable triggering event, the multipliers that have built up on each of the primary game paylines are applied to the bonus game payline which corresponds to that primary game payline.

In one embodiment, at the conclusion of each free spins game, each of the payline multipliers is reset to the initial multiplier value and primary game play resumes. A player can continue playing the primary game in attempt to build the payline multipliers back up for a next round of the free spins game. In another embodiment, rather than resetting the multiplier values when one free spins game ends, the gaming device saves the multiplier values associated with the paylines from one free spins game to another. In this manner, the present disclosure provides payline multipliers which persistent across multiple free spins games. Since it is possible for one or more of the payline multipliers to increase to high levels in each round of the free spins game, there is an incentive for a player to continue playing at the gaming device in hopes of triggering another round of the free spins game.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A gaming system comprising:

at least one input device;

at least one display device;

at least one processor; and at least one memory device which stores a plurality of instructions, which when executed by the at least one processor, cause the at least one processor to operate with the at least one input device and the at least one display device to:

(a) display a game associated with a plurality of reels, said reels including a plurality of symbols, a plurality of paylines associated with said reels;

(b) for each payline, associate a modifier having a modifier value with said payline for a play of said game, wherein upon initiation of said play of the game, the modifier value of each of said modifiers is an initial modifier value; and (c) provide a plurality of free spins of the reels to a player for said play of the game, and for each of said free spins:

(i) cause an activation of the reels;

(ii) determine whether any of one or more designated symbol combinations are indicated on any of the paylines;

(iii) for each of the designated symbol combinations indicated on each of the paylines in said free spin, provide any award associated with said indicated designated symbol combination to the player, wherein said award is modified by the modifier associated with said payline; and (iv) if there is at least one free spin remaining from said provided number of free spins, for each payline on which one of the designated symbol combinations was indicated:

(1) increment the modifier value of the modifier associated with said payline distinct from any incrementing of any of the modifier values of the modifiers associated with the other paylines, and (2) utilize said incremented modifier in a next free spin.

2. The gaming system of claim 1, wherein the plurality of instructions, when executed by the at least one processor, cause the at least one processor to, each time one of the designated symbol combinations is indicated on one of said paylines, increment the modifier value of the modifier associated with said payline by one of: a predetermined amount and a randomly determined amount.

3. The gaming system of claim 1, wherein the plurality of instructions, when executed by the at least one processor, cause the at least one processor to, for each payline on which one of the designated symbol combinations was indicated, increment the modifier value of the modifier associated with said payline based on a number of symbols in said designated symbol combination.

4. The gaming system of claim 1, wherein at least one of the designated symbol combinations includes a winning symbol combination.

5. The gaming system of claim 1, wherein at least one of the designated symbol combinations includes a non-winning symbol combination.

6. The gaming system of claim 1, wherein each of the modifiers associated with said paylines have a same initial modifier value.

7. The gaming system of claim 1, wherein each of the modifiers associated with said paylines have different initial modifier values.

8. The gaming system of claim 1, wherein a plurality of the modifiers associated with said paylines have different initial modifier values.

9. The gaming system of claim 1, wherein the plurality of instructions, when executed by the at least one processor, cause the at least one processor to, for each of the modifiers associated with each of the paylines, reset the modifier value of said modifier to said modifier's initial modifier value when there are no free spins remaining in said play of the game.

10. The gaming system of claim 1, wherein the plurality of instructions, when executed by the at least one processor, cause the at least one processor to, for each of the modifiers associated with each of the paylines, reset the modifier value of said modifier to said modifier's initial modifier value when an award that has been modified by said modifier is provided to the player.

11. The gaming system of claim 1, wherein the modifiers include multipliers.

12. A gaming system comprising:

at least one input device;

at least one display device;

at least one processor; and at least one memory device which stores a plurality of instructions, which when executed by the at least one processor, cause the at least one processor to operate with the at least one input device and the at least one display device to:

(a) display a game, said game associated with a plurality of reels, said reels including a plurality of symbols, a plurality of paylines associated with said reels;

(b) for each of the paylines, associate a modifier having a modifier value with said payline for a play of said game, wherein upon initiation of said play of the game, each of the modifier value of each of said modifiers is an initial modifier value;

(c) provide a plurality of free spins of the reels to a player for said play of the game;

(d) utilize one of said free spins to cause an activation of the reels;

(e) determine whether any of one or more designated symbol combinations are indicated on any of the paylines;

(f) for each of the designated symbol combinations indicated on each of the paylines, provide to the player any award associated with said indicated designated symbol combination, wherein said award is modified by the modifier associated with said payline;

(g) if there is at least one free spin remaining in said play of the game, for each payline on which one of said designated symbol combinations was indicated, increment the modifier value of the modifier associated with said payline distinct from any incrementing of any of the modifier values of any of the modifiers associated with the other paylines; and (h) repeat (d) to (g) until there are no free spins remaining.

13. The gaming system of claim 12, wherein the plurality of instructions, when executed by the at least one processor, cause the at least one processor to, each time one of the designated symbol combinations is indicated on one of said paylines, increment the modifier value of the modifier associated with said payline by one of: a predetermined amount and a randomly determined amount.

14. The gaming system of claim 12, wherein the plurality of instructions, when executed by the at least one processor, cause the at least one processor to, for each payline on which one of the designated symbol combinations was indicated, increment the modifier value of the modifier associated with said payline based on a number of symbols in said designated symbol combination.

15. The gaming system of claim 12, wherein at least one of the designated symbol combinations includes a winning symbol combination.

16. The gaming system of claim 12, wherein at least one of the designated symbol combinations includes a non-winning symbol combination.

17. The gaming system of claim 12, wherein each of the modifiers associated with said paylines have a same initial modifier value.

18. The gaming system of claim 12, wherein each of the modifiers associated with said paylines have different initial modifier values.

19. The gaming system of claim 12, wherein a plurality of the modifiers associated with said paylines have different initial modifier values.

20. The gaming system of claim 12, wherein the plurality of instructions, when executed by the at least one processor, cause the at least one processor to, for each of the modifiers associated with each of the paylines, reset the modifier value of said modifier to said modifier's initial modifier value when there are no free spins remaining in said play of the game.

21. The gaming system of claim 12, wherein the plurality of instructions, when executed by the at least one processor, cause the at least one processor to, for each of the modifiers associated with each of the paylines, reset the modifier value of said modifier to said modifier's initial modifier value when an award that has been modified by said modifier is provided to the player.

22. The gaming system of claim 12, wherein the modifiers include multipliers.

23. A gaming system comprising:

at least one input device;

at least one display device;

at least one processor; and at least one memory device which stores a plurality of instructions, which when executed by the at least one processor, cause the at least one processor to operate with the at least one input device and the at least one display device to:

(a) display a primary game operable upon a wager, said primary game associated with a plurality of primary game reels including a plurality of symbols, said primary game reels associated with a plurality of primary game paylines;

(b) associate a modifier value with each of said primary game paylines;

(c) for each of a plurality of plays of the primary game:

(i) cause an activation of the primary game reels;

(ii) determine whether said activation results in any of one or more designated symbol combinations being indicated on any of the primary game paylines; and (iii) for each payline on which one of the designated symbol combinations was indicated, increment the modifier value associated with said primary game payline distinct from any incrementing of any of the modifier values associated with the other primary game paylines;

(d) determine whether a triggering event occurs;

(e) if said triggering event occurs, provide to the player a number of free spins of a plurality of bonus game reels, said bonus game reels associated with a plurality of bonus game paylines, each of said bonus game paylines corresponding to one of the primary game paylines; and (f) for each of said provided free spins:

(i) cause an activation of said bonus game reels;

(ii) determine whether any of the designated symbol combinations are indicated on any of said bonus game paylines; and (iii) for each of the designated symbol combinations indicated on each of said bonus game paylines, provide any award associated with said indicated designated symbol combination to the player, wherein said award is modified by the modifier value associated with the primary reel payline which corresponds to said bonus reel payline.

24. The gaming system of claim 23, wherein the triggering event includes an event associated with the primary game.

25. The gaming system of claim 23, wherein the plurality of instructions, when executed by the at least one processor, cause the at least one processor to, for each of the designated symbol combinations indicated on each of the primary game paylines, provide any award associated with said designated symbol combination to the player.

26. The gaming system of claim 23, wherein the primary game reels and the bonus game reels are the same.

27. The gaming system of claim 23, wherein the primary game reels and the bonus game reels are different.

28. The gaming system of claim 23, wherein the plurality of instructions, when executed by the at least one processor, cause the at least one processor to, each time one of the designated symbol combinations is indicated on one of said primary game paylines, increment the modifier value associated with said primary game payline by one of: a predetermined amount and a randomly determined amount.

29. The gaming system of claim 23, wherein the plurality of instructions, when executed by the at least one processor, cause the at least one processor to, for each primary game payline on which one of the designated symbol combinations was indicated, increment the modifier value associated with said primary game payline based on a number of symbols in said designated symbol combination.

30. The gaming system of claim 23, wherein at least one of the designated symbol combinations includes a winning symbol combination.

31. The gaming system of claim 23, wherein at least one of the designated symbol combinations includes a non-winning symbol combination.

32. The gaming system of claim 23, wherein the plurality of instructions, when executed by the at least one processor, cause the at least one processor to, for each bonus game payline on which one of the designated symbol combinations was indicated, increment the modifier value corresponding to said bonus game payline if there is at least one free spin of the bonus game reels remaining.

33. The gaming system of claim 32, wherein the plurality of instructions, when executed by the at least one processor, cause the at least one processor to, for each bonus game payline on which one of the designated symbol combinations was indicated, increment the modifier value corresponding to that bonus game payline by one of: a predetermined amount and a randomly determined amount.

34. The gaming system of claim 32, wherein the plurality of instructions, when executed by the at least one processor, cause the at least one processor to, for each bonus game payline on which one of the designated symbol combinations was indicated, increment the modifier value corresponding to that bonus game payline based on a number of symbols in said designated symbol combination.

35. The gaming system of claim 23, wherein the modifier values include multipliers.

* * * * *

UNITED STATES PATENT AND TRADEMARK OFFICE

CERTIFICATE OF CORRECTION

PATENT NO. : 8,277,305 B2
APPLICATION NO. : 11/937814
DATED : October 2, 2012
INVENTOR(S) : Scott A. Caputo et al.

It is certified that error appears in the above-identified patent and that said Letters Patent is hereby corrected as shown below:

IN THE CLAIMS

In Claim 12, Column 29, Line 46, delete “each of”.
In Claim 32, Column 32, Line 20, between “value” and “corresponding” insert --associated with the primary game payline--.
In Claim 33, Column 32, Line 27, between “value” and “corresponding” insert --associated with the primary game payline--.
In Claim 34, Column 32, Line 34, between “value” and “corresponding” insert --associated with the primary game payline--.

Signed and Sealed this
Nineteenth Day of February, 2013

Teresa Stanek Rea
*Acting Director of the United States Patent and Trademark Office*